United States Patent [19]
Bourke

[11] Patent Number: 5,755,293
[45] Date of Patent: May 26, 1998

[54] DRILL/SAW APPARATUS

[76] Inventor: George C. Bourke, 103 Spanker Ridge Dr., Bentonville, Ark. 72712

[21] Appl. No.: 733,332

[22] Filed: Oct. 17, 1996

Related U.S. Application Data

[63] Continuation-in-part of Ser. No. 591,692, Jan. 25, 1919, Pat. No. 5,595,250, which is a continuation-in-part of Ser. No. 414,029, Mar. 31, 1995, Pat. No. 5,566,768.

[60] Provisional application No. 60/022,738, Jul. 29, 1996.

[51] Int. Cl.⁶ .................................................. B23D 51/10
[52] U.S. Cl. ........................... 173/29; 30/376; 30/392; 30/500; 144/48.6; 408/20
[58] Field of Search ............................. 173/29; 30/392, 30/500, 376; 144/48.6; 408/20, 21

[56] References Cited

U.S. PATENT DOCUMENTS

| | | |
|---|---|---|
| 1,855,371 | 4/1932 | Ungar. |
| 2,547,922 | 4/1951 | Bechtold ............... 143/68 |
| 2,631,619 | 3/1953 | Folli ................... 143/68 |
| 2,713,271 | 7/1955 | Dodegge ................ 74/50 |
| 2,764,188 | 9/1956 | Hoffman ............... 143/60 |
| 2,822,005 | 2/1958 | Lee et al. ............. 143/68 |
| 3,398,588 | 8/1968 | Meier .................. 74/50 |
| 3,496,972 | 2/1970 | Rees ................... 143/68 |
| 3,528,463 | 9/1970 | Mejia .................. 143/68 |
| 3,876,015 | 4/1975 | Kivela ................. 173/170 |
| 4,841,643 | 6/1989 | Colella et al. ......... 30/500 |
| 4,949,463 | 8/1990 | Chen ................... 30/500 |
| 4,972,589 | 11/1990 | Povleski .............. 30/500 |
| 5,025,562 | 6/1991 | Palm .................. 30/392 |
| 5,083,376 | 1/1992 | Lentino ............... 30/392 |

FOREIGN PATENT DOCUMENTS 1384903  2/1995  United Kingdom ............... 30/500

Primary Examiner—Scott A. Smith
Attorney, Agent, or Firm—Head, Johnson & Kachigian

[57] ABSTRACT

A compact drill attachment or device for converting rotary drill motion to reciprocating saw action and adapted to be used in conjunction with cordless, electric and pneumatic hand held drills. A practical and extremely versatile tool to accomplish sawing results that were before inconceivable. Featuring a plurality of different reciprocal flush cut options, a plurality of entries from a power source to accomplish close quarter sawing, a blade stroke distance which exceeds the competition, a cutting stroke which is faster than the cleaning stroke, a plurality of shoe or fence settings, and which accepts major brands of reciprocal saw or jigsaw blades.

39 Claims, 24 Drawing Sheets

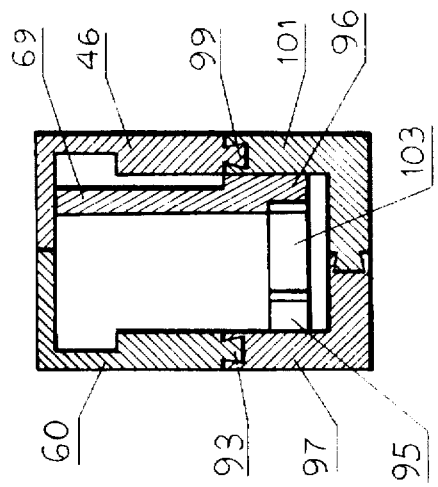
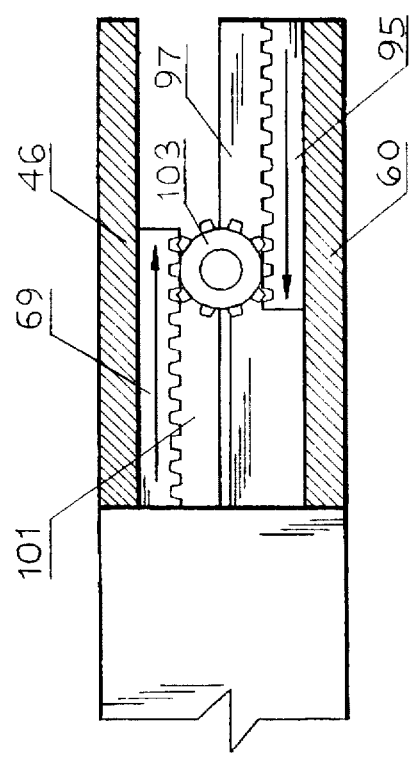
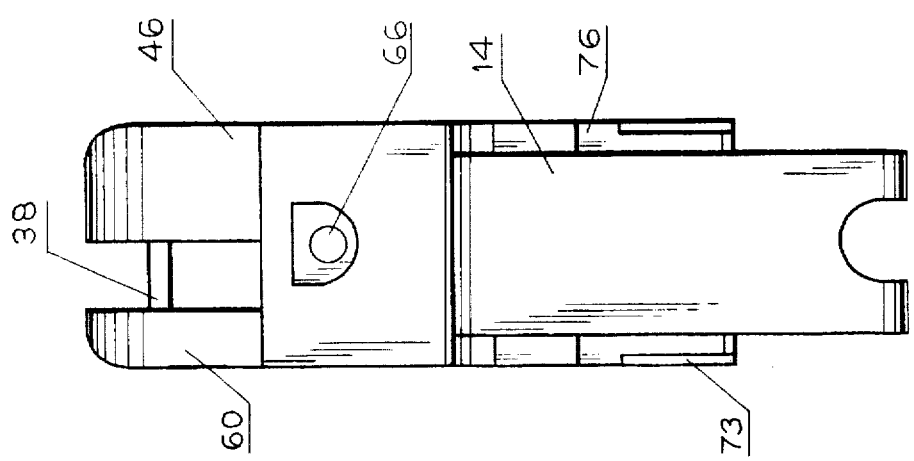
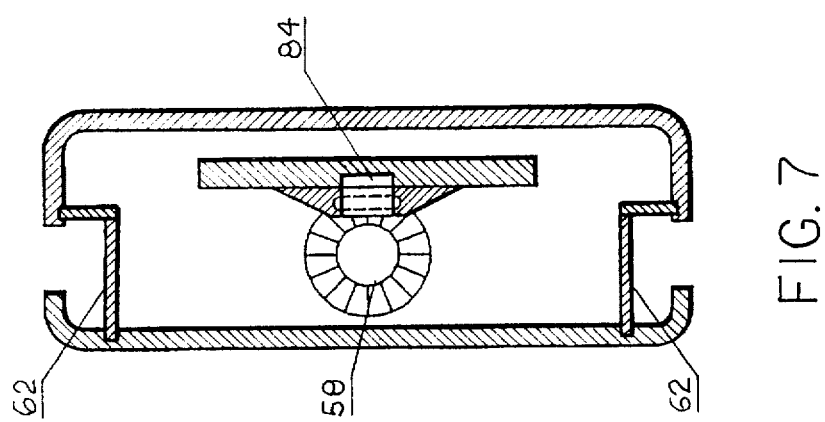

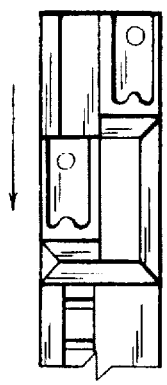
FIG.19E
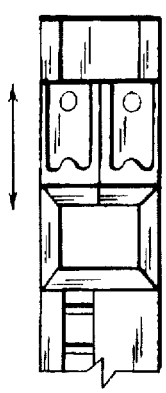
FIG.19D
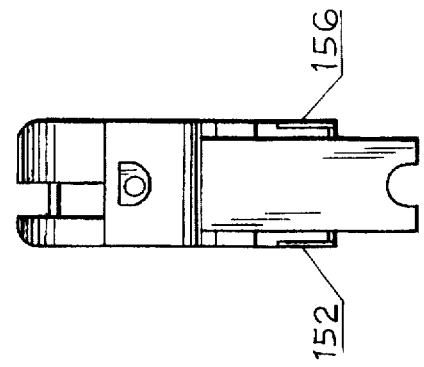
FIG. 18
FIG. 17
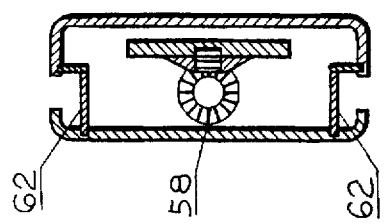
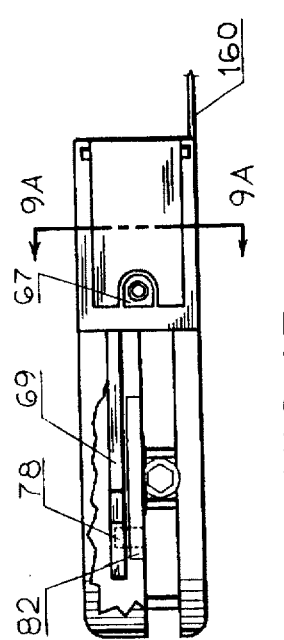
FIG. 13

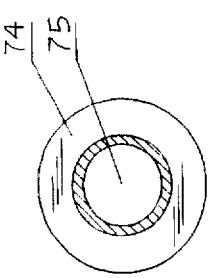
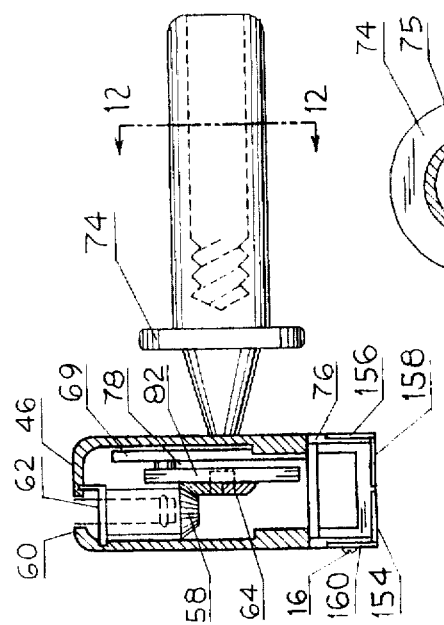

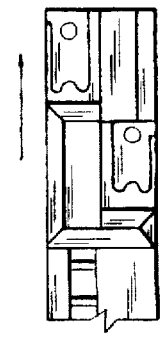
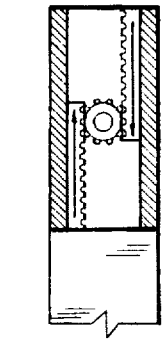
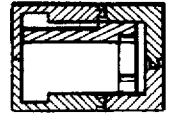
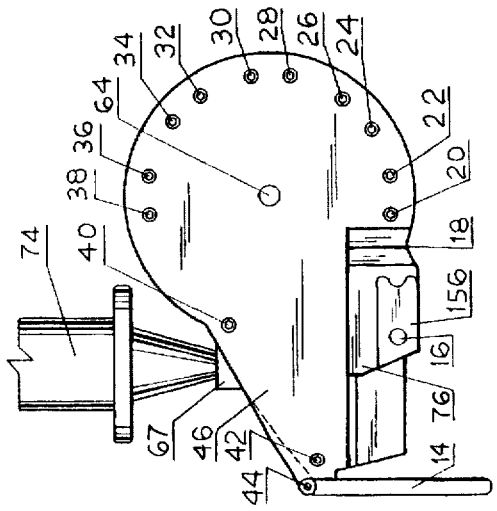

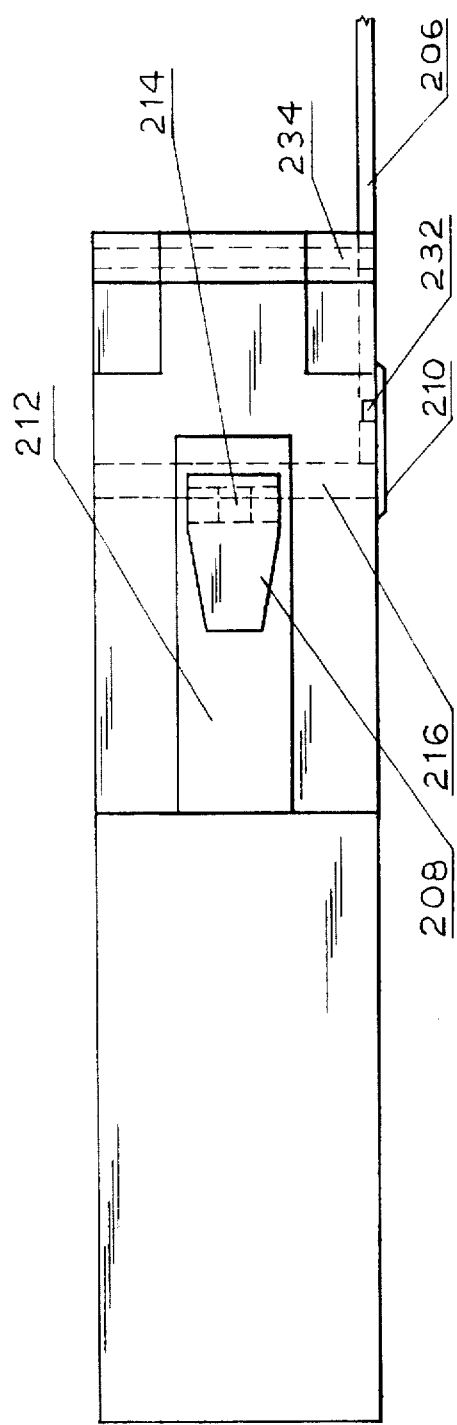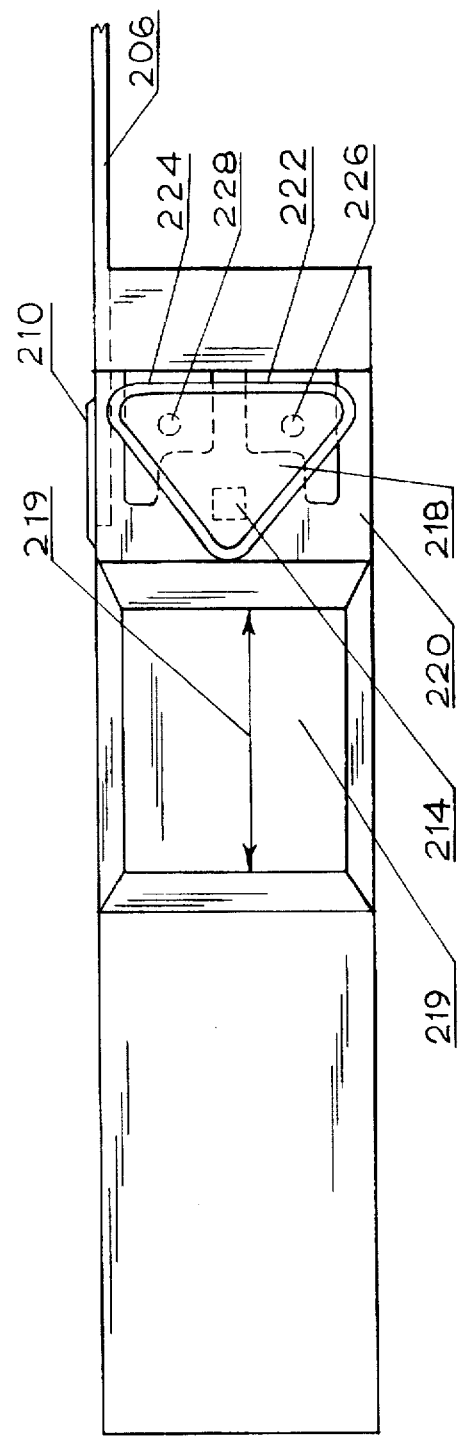

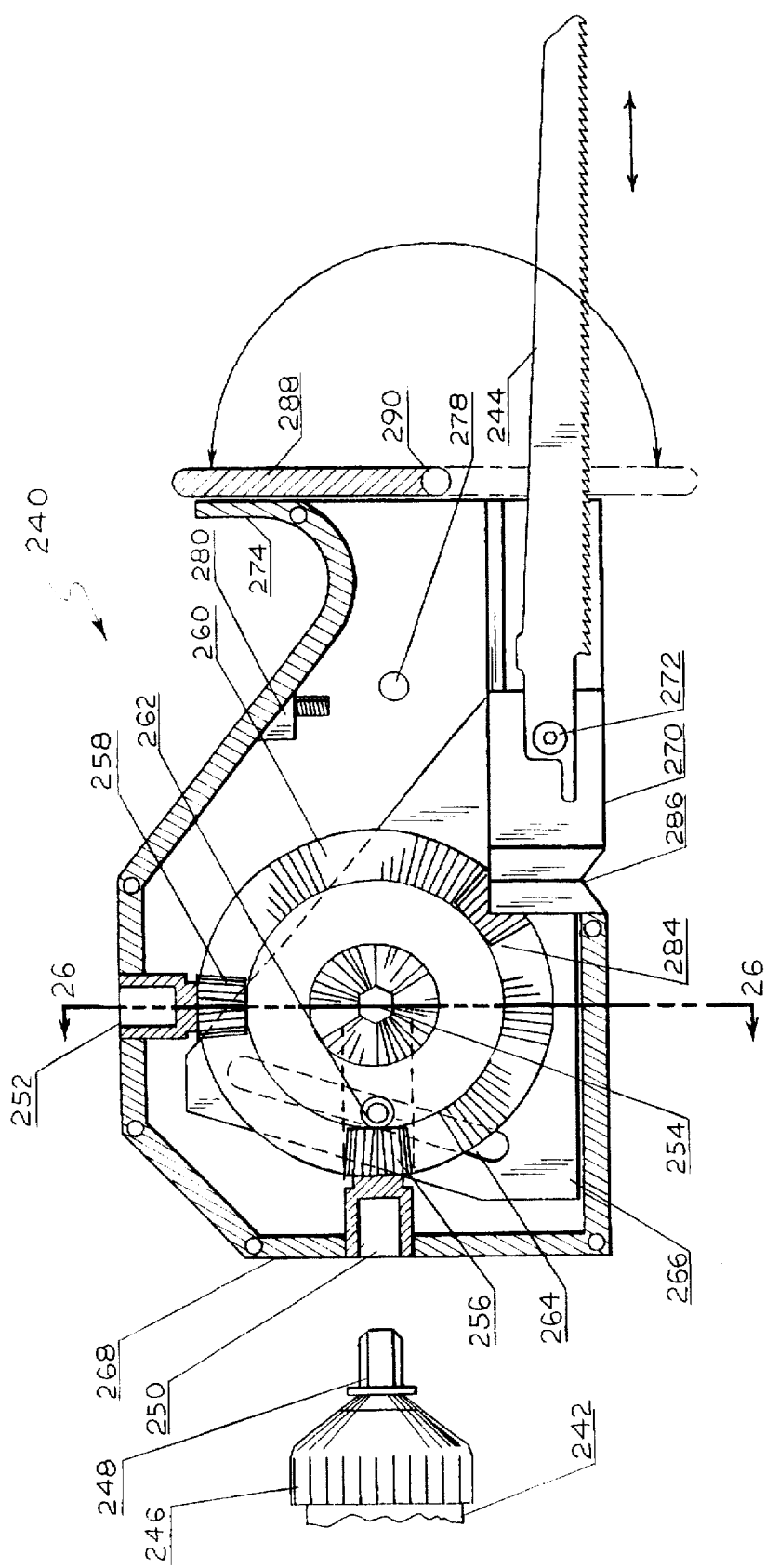

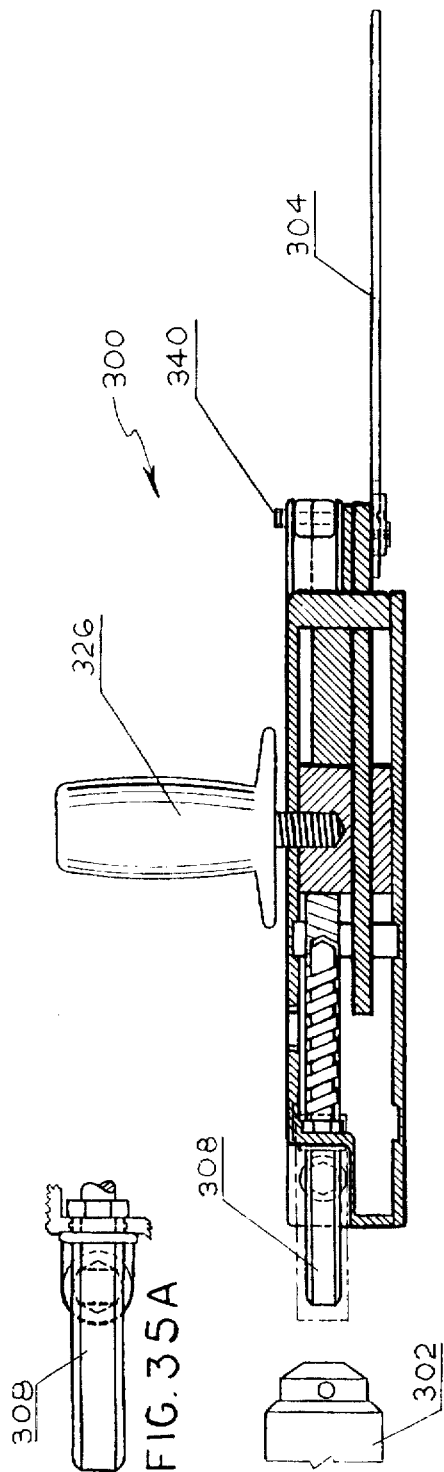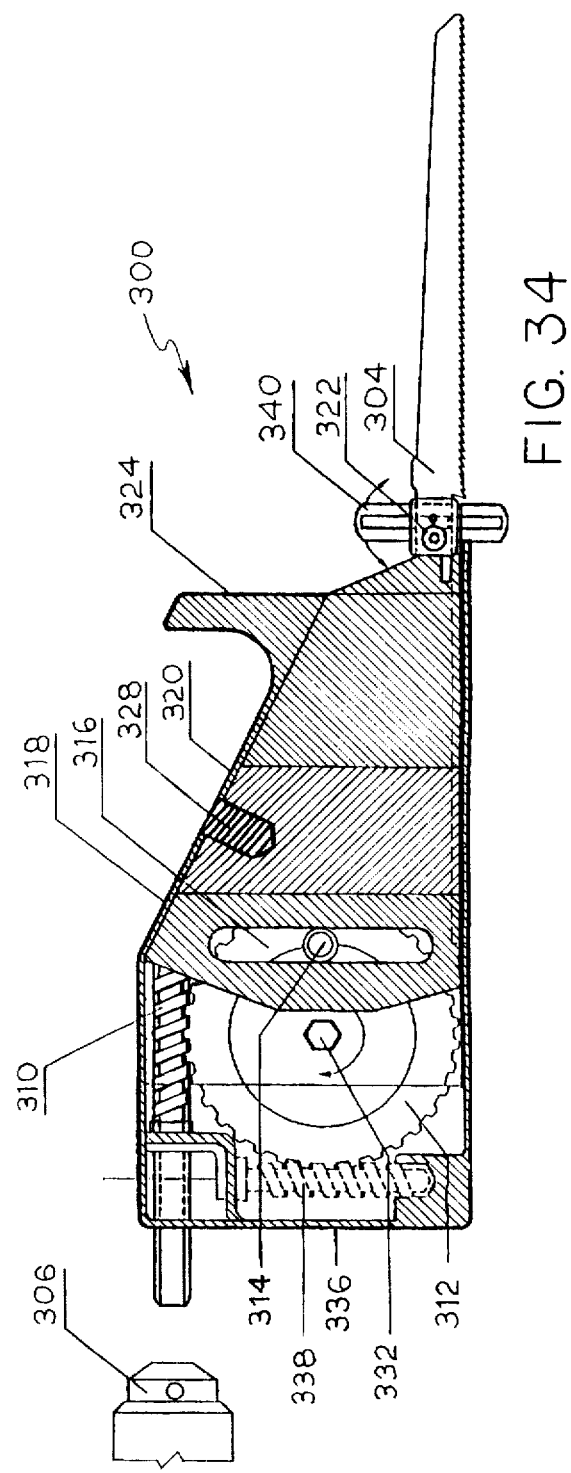

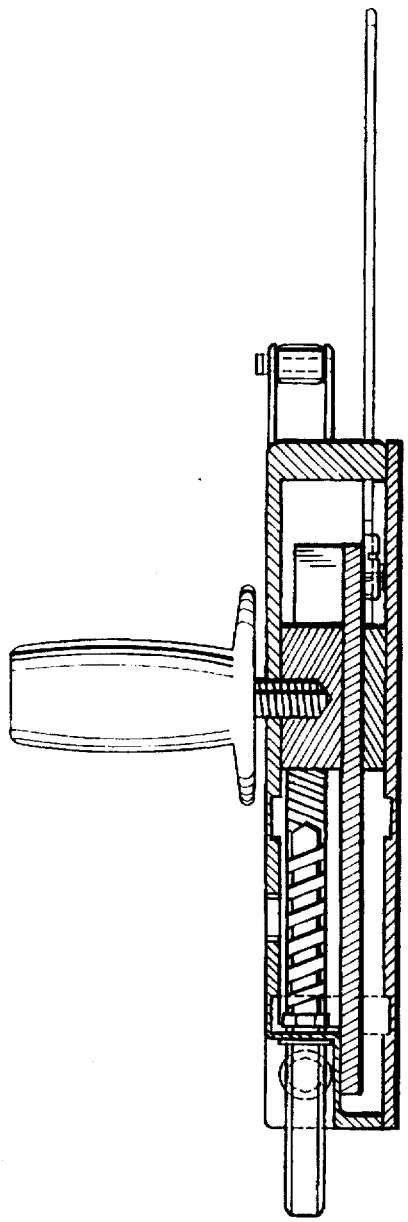
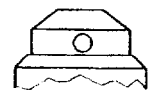
FIG. 39
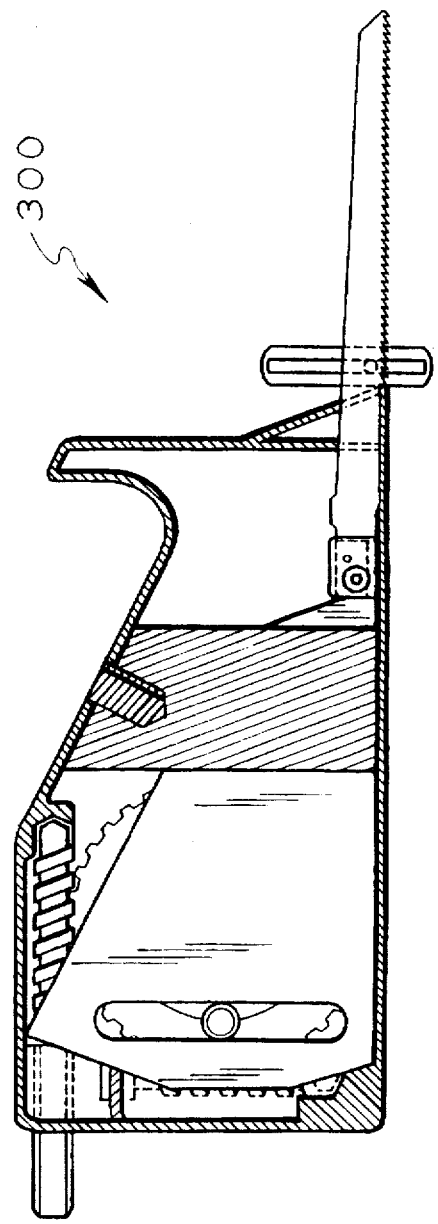
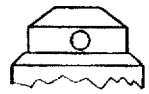
FIG. 38

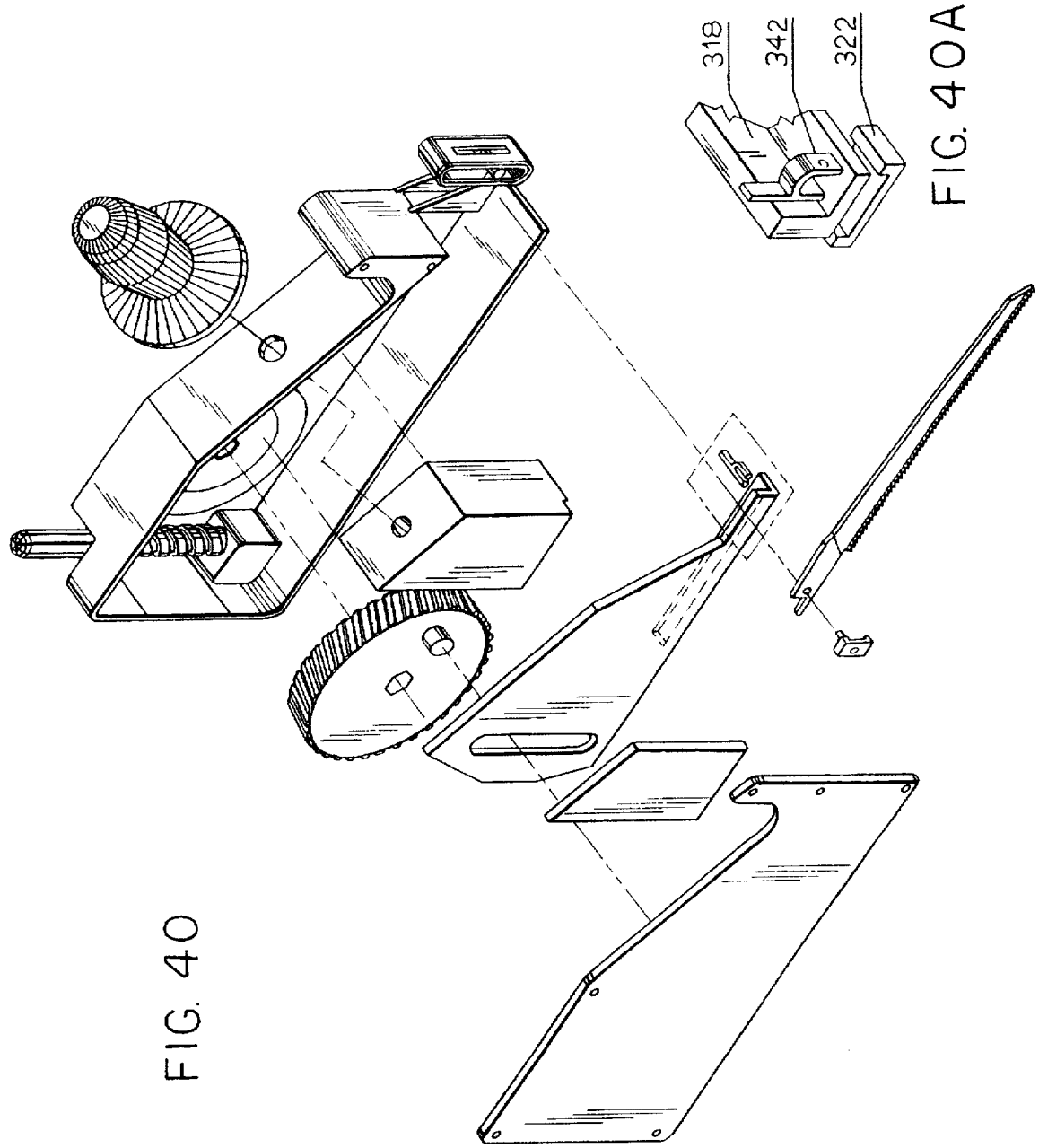

DRILL/SAW APPARATUS

CROSS-REFERENCE TO RELATED APPLICATIONS

This application is a continuation-in-part of provisional application Ser. No. 60/022,738, filed Jul. 29, 1996, and of allowed patent application Ser. No. 08/591,692, filed Jan. 25, 1996, now U.S. Pat. No. 5,595,250 which is a continuation-in-part of allowed application Ser. No. 08/414,029, filed Mar. 31, 1995, to issue as U.S. Pat. No. 5,566,768, on Oct. 22, 1996.

BACKGROUND OF THE INVENTION

1. Field of the Invention

The present invention relates to the field of hand power tools and in particular to adapters for or modifications of drills for changing a rotary drilling motion to a reciprocating sawing action. This invention especially pertains to a compact drill adapter or convertor and method which converts rotational motion of a drill to reciprocating sawing action and thereby expanding the utility and versatility of cordless, electric or pneumatic power drills or brace manual drills.

2. Prior Art

Many types of reciprocating hand tool attachments for rotary hand tools are known today as evidenced by the disclosures of U.S. Pat. Nos. 2,631,619, 2,713,271, 2,764,188, 2,822,005, 3,398,588, 3,876,015, 4,841,643, 4,949,463, and British Patent No. 1,384,903 to name only a few. Each of these prior art drill attachments lack multiple entry ports, multiple flush cutting features, and/or numerous fence positions.

The prior references show a number of attachments which require additional clamps, brackets and other means of securing the reciprocating attachments to the drill motor. Extra effort and time is required to clamp and unclamp these devices to the drill. Other disclosures lack versatility, have a short blade stroke, and/or are too large in size, weight and price.

In the past the majority of drill attachments were powered by electric drills. Today, however, the ever popular cordless, rechargeable drills are a convenient power source.

Reciprocating saws are described for example in U.S. Pat. Nos. 3,528,463, 5,025,562, and 5,083,376. The reciprocating saws on the market today are expensive, bulky, heavy and/or somewhat dangerous. In many instances the user wants to make a flush cut but is unable to. None of the reciprocating saw manufacturers appear to have a flush cutting feature. Also, the size of the standard reciprocating saw limits the user in getting into tight or close quarters. In the past, the user would have to use the blade in a bent position while sawing the material.

Reciprocating saws are heavy, powerful and have an aggressive cutting action which is difficult to control. Some reciprocating saws on the market have a variable speed feature. In some instances a slower cutting action is required. One example is plunge cutting. While plunge cutting at high speed the saw blade has a tendency to whip from side to side, creating unwanted damage. This is very frustrating, costly and dangerous. The user has no option but to use the tool in this manner when the need persists.

U.S. Pat. No. 4,972,589 describes a rotary to rotary drill attachment for sawing or sanding.

Hence, there exists a need for a relatively inexpensive, easily attached and detached, drill attachment, convertor, or device for not only converting the rotary motion of the drill to a reciprocating sawing action, but also one which addresses the problems and drawbacks of the prior art devices.

BRIEF SUMMARY OF THE INVENTION

The apparatus, tool, convertor, device, accessory, or adapter and method of the present invention satisfies the need for a compact, versatile, lightweight and practical reciprocating saw. Due to the popularity of the cordless drill, the drill adapter or tool of the present invention works in conjunction with a cordless or corded drill. The tool can be moved into and out of operating position with a cordless, electric or pneumatic drill. No clamping or unclamping is necessary. One simply inserts one end of a hex fitting or drive pin into the drill chuck, the other end into the adapter, and starts cutting. The compact size of this tool makes it suitable for tradesman to carry in a pocket or tool apron.

Not only is the drill adapter of the present invention about one quarter the size of the existing reciprocating saws but also one quarter the weight. The drill adapter of the present invention provides the desired features at low cost. This tool has one, two, three, or four different selections for flush cutting. It also has a radial access feature allowing the user to choose selected angle drive ports or a variable drive port from about 0 to 225 degrees. When the hex fitting is inserted directly into the side of the tool, the blade speed is increased to a ratio of 1 to 1.

Since the drill adapter has bottom flush cut features, a flip fence is implemented to work with the left and right options. When the saw blade is attached on either the left or right side, the fence should be in the downward position. When the saw blade is attached to either bottom position, the flip fence is not needed and therefore should be in the upward position.

A removable multiple position handle is another of the features of this tool design. The handle mounts on the side or the top of the tool for stabilizing purposes. It is removable for storage purposes. The handle may include a swivel intermediate its ends.

Another versatile feature of the present tool is that the handle includes in its free end a large opening with large coarse threads similar to those found in the handle or head of paint roller handles and floor broom heads. This large threaded opening in the handle allows the user to attach an extension handle, rod or pole to the tool handle. In order to power the reciprocating saw adapter when it is located at the end of an extension pole, one simply uses a 5/16 inch hexagon extension. This feature allows the user to save a great deal of time, as well as the ability to perform difficult cuts in awkward positions without the need of a ladder. Because of the versatility of this tool, one is able to use it in a standing position as well as a kneeling position.

In all the conventional reciprocal saws, it is often difficult to view the cut line because the fence or shoe surrounds the saw blade. In contrast, the present tool design allows the user to view the entirety of the material which is being cut.

The process of changing a blade on several other brands is difficult due to their poor design. The present tool provides for changing the blade by merely removing a set screw or by releasing a quick change retainer.

Accordingly, several objects and advantages of the adapter and method of the present invention are: from one to four different flush cutting options, left, right and two bottom positions; the power source can be inserted in the tool in one of two or more different insert locations, one being the direct drive perpendicular to the saw blade, the other being one or more radial access ports; the range of angles for the drive on the variable radial access is from about 0 degrees to 225 degrees; in accordance with one embodiment, the drive arm slot on this tool is angled to produce a faster cutting stroke than cleaning stroke; if opposite direction is needed, this tool works when the drill motor is operated in forward or reverse; in accordance with at least one example, the length of the blade stroke is 1½ inches or more whereas other leading manufacturers offer only 1 inch or 1¼ inches; the speed of the tool is controlled by the trigger on the drill motor, and the majority of cordless drills have multiple clutch settings and variable speed; has features which enhance safety and protect the user and the tool; the size and weight is one quarter of the existing reciprocating saws; this tool works with any cordless, electric, manual, hydraulic or pneumatic drill, or a rotary motor having a chuck which will receive a ⁵⁄₁₆ inch hexagon shaft; the flip fence allows multiple flush cuts; for bottom and some side instances, the fence locks into the upward position; and, when in the down position, the fence will pivot against the material being cut.

The direct drive or side drive port provides for faster reciprocating motion. The tool is well balanced, easy to handle and comfortable to use. It is sturdy in construction, but is light in weight. The present adapter or tool gives better and faster results and is to be priced about 75 percent less expensive than existing reciprocating saws on the market. Also, the present tool can accept any of a large variety of the conventional reciprocal saw and jigsaw blades on the market.

The fact that this new adapter accepts cordless drills eliminates the need for the use of extension cords or electrical outlets which enhances the safety for the user.

In many instances the user has to drill a starter hole where there is no room to plunge cut or in tight quarters where possible injury could result. For extremely tight quarters, a right angle drill could be utilized. Since the adapter of the present invention is totally powered by the drill motor, a quality cordless drill with variable speed and multiple clutch settings provides for optimum performance and safety.

In the past, cutting torches have been used on larger jobs to cut steel alloys of all types. However, the torch system is cumbersome and requires an open flame to operate. The dangers and the inconveniences of the torch system are numerous. Other means of cutting materials on job sites are high speed chop saws which are similar to gasoline powered chain saws, or cut off saws which are mounted to a table having a screw type vise to hold the material. One disadvantage of the cut-off saw is that the material has to be brought to the saw to be cut. The present tool allows the user to easily bring the tool to the material in question.

From a competitive standpoint, the "Hand Over Fist" drill adapter or attachment of the present invention should in time make all the other reciprocating saw or attachment designs obsolete.

Features of the present tool include: large cutting stroke— 1½ inches of cutting stroke (more than the existing reciprocating saws), compact size—larger version is under 6½ inches long by under 4 inches high and less than 1¾ inches in width (less than half the size of the competition), and lightweight —weighs less than 2½ lbs. The weight of the super Sawzall by Milwaukee is over 8½ lbs. The weight of Porter Cable's Model #9637 is 9 lbs. The majority of the other brands are about 6 lbs.

One unique advantage of a particular example of the present tool is the ability to flush cut along either side of tool and also in two directions on the bottom of the tool. U.S. Pat. No. 3,528,463 describes an electric saw with a single flush cut feature.

For getting into tight quarters, the present tool has a radial access feature which allows the user to accomplish difficult sawing tasks. The tool can also be powered from the side of the case perpendicular to the radial access feature. When an extension pole and a longer ⁵⁄₁₆ inch hexagon drive shaft are used, one can eliminate the use of a ladder.

The internal mechanical elements of the present tool include a durable Scottish yoke. Also, the unique angle of the drive slot results in a quicker cutting stroke than cleaning stroke. None of the existing reciprocating saws on the market have this feature.

A larger version of the present tool accepts other brands of reciprocating saw blades and a smaller version accepts other brands of jig or saber saw blades.

Vibration is usually a problem in any type of reciprocating saw. However, the flywheel on the present tool is weighted or counterbalanced to minimize any vibration at any given speed. In accordance with an alternative anti-vibration design of the present invention, the U-shaped slider is split in half so that when the drive arm is in its extended position, the other half of the U-shaped slider is in the retracted position. This creates an opposing inertia which eliminates the majority of the vibration in the tool.

The present invention relates to hand power tools especially those used for sawing materials in awkward and/or remote places. The reciprocal saws on the market today are neither compact nor have sufficient features to justify their price. So often the user has to reach a difficult location to make a flush cut, and cannot.

The present invention can be attached to a drill as easily as a drill bit. The keyless feature of many modern chucks expedites the process. Because of the lack of a motor, this invention is more affordable to the consumer who realizes that only this attachment need be purchased.

Traditionally reciprocating saws came onto the market to be convenient and easier to complete a cutting task. During construction and especially remodeling there is always something to cut or remove. In the past, the user would get out the reciprocating saw, untangle an extension cord, locate a working receptacle, then tackle the task at hand. Now with the present adapter and modern cordless drills having ample power, torque and battery longevity, any cutting task can be accomplished much faster and with satisfactory results.

The present tool is very useful around the house. Simply put, almost every home has an electric or cordless drill. This tool is designed to not only cut wood, but just about any substance as long as the proper blade has been installed.

The present drill accessory was designed for versatility, practicality and flush cutting. It weighs less than half of the existing reciprocating saws excluding the weight of the drill itself. It incorporates one or more flush cut features in which the blade design protrudes from the unit on either side or on the bottom. In accordance with one embodiment, the working motion or stroke is 1¾ inches while others are content with 1 inch (Black and Decker) or 1¼ inches (Milwaukee Sawzall). The present device can be connected to the drill motor in two or three different positions, which none of the others can do. A choice of blade speed is selected, for example, on the outer or inner hub bevel gear. Any quality drill on the market has variable speed and clutch setting adjustments which will enhance the safety of the drill accessory or tool. So often, one encounters tight and awkward places that a conventional reciprocating saw would just not fit. The 90 degree feature of the present device is the solution to this problem. The fact that it is cordless means no need for an extension cord or a working electrical outlet.

The present tool is totally powered by the drill motor which can be controlled if need be by the desired clutch setting. With the variable speed drill the user can start out at a snail's place if needed for cutting a selected material, filing or sanding.

In accordance with one embodiment, the drill attachment is adapted for use with a cordless, electric or pneumatic drill and has three flush cut features which enable a user to saw in a reciprocating action. A compact metal enclosure houses steel bevel gears which work together to generate rotary motion of an eccentric peg to drive an arm to which a blade is attached. The rotation of the drill enters the tool by a removable hexagonal shaft which can be inserted into the tool at three different angles depending on the task. The small bevel gears mesh with a larger bevel hub gear having the eccentric peg thereon. The peg is located inside an elongated slot of the blade drive arm. As the small bevel gear rotates, its speed is increased by the ratio of the larger bevel hub gear. The rotation of the larger bevel hub gear is converted to a linear reciprocating motion which drives the blade.

In accordance with another example of the present invention adapted for use with a cordless, electric or pneumatic drill device and which enables a user to saw in a reciprocal action, a compact metal enclosure houses steel helical and worm gears. An eccentric peg is attached to the worm gear drive an arm to which a blade is attached. The rotation of the drill enters the tool by a removable hexagonal shaft which can be inserted into the tool at three different angles depending on the task. The worm gear meshes with the helical gear and the eccentric peg is located inside an elongated slot of the blade drive arm. As the worm gear rotates its speed is exchanged for torque in the helical gear. The rotation of the helical gear is converted to a linear reciprocating motion which drives the blade.

The principal object of the present invention is the provision of an improved drill apparatus, convertor, adapter, accessory, device, tool, or the like.

Another object of the present invention is the provision of a method of sawing, cutting, filing, sanding, or the like using the drill adapter of the present invention.

A still further object of the present invention is the provision of a drill adapter which is relatively inexpensive, easy to use, versatile, lightweight, and compact.

A more particular object of the present invention is the provision of a drill adapter providing four different flush cut positions.

Another object of this invention is to provide a reciprocating drill attachment which overcomes one or more of the deficiencies of the prior art drill attachments.

Other objects and further scope of the applicability of the present invention will become apparent from the detailed description to follow, taken in conjunction with the accompanying drawings wherein like parts are designated by like reference numerals.

BRIEF DESCRIPTION OF THE SEVERAL VIEWS OF THE DRAWINGS

FIG. 2A is a cross-section along line 2A—2A in FIG. 2 of the handle showing a cavity where an extension can be inserted. The handle is mounted on left side of tool.

FIG. 7 is a cross-section view along line 7—7 in FIG. 1 representing the case, bevel gears and dust ring.

FIG. 8 is a front view of the tool of FIG. 1 with the flip fence in the downward position.

FIGS. 9A–9E relate an alternative embodiment of the blade drive and support elements to reduce vibration.

FIG. 9A is a frontal cross-section of a portion of the tool showing the case, drive arm, racks and pinion gear, and L-shaped sliders.

FIG. 9B is a partial top view of internal hatched case and racks and pinion gear.

In FIGS. 9C, 9D, and 9E, the saw blade is removed to show detail. FIG. 9C is a bottom view showing the opposing L-shaped sliders with the right side slider at the fully extended position and the left side slider at the fully retracted position.

FIG. 9D is a bottom view showing both L-shaped sliders at the midway point.

FIG. 9E is a bottom view showing the opposing L-shaped sliders with the right side slider at the fully retracted position and the left side slider at the fully extended position.

FIGS. 10–19 represent yet another embodiment of the tool or adapter of the present invention adapted for use with a jigsaw blade.

FIG. 10 is a right side view of the tool or adapter.

FIG. 11 is a front plan view of the adapter of FIG. 10.

FIG. 12 is a cross-section along line 12—12 in FIG. 11.

FIG. 13 is a top view of the adapter of FIG. 10.

FIG. 14 is a left side view of the drill adapter of FIG. 10.

FIG. 15 is a back view of the adapter of FIG. 10.

FIG. 16 is a bottom view of the adapter of FIG. 10.

FIG. 17 is a cross-section view along line 17—17 in FIG. 10.

FIG. 18 is a front view of the tool of FIG. 10.

FIGS. 19A–19E relate to an alternative embodiment of the blade drive and support element to reduce vibration.

FIG. 19A is a frontal cross-section of a portion of the tool.

FIG. 19B is a partial-top view of case and racks and pinion gear.

FIG. 19C is a bottom view showing the opposing L-shaped sliders.

FIG. 19D is a bottom view showing both L-shaped sliders at the midway point.

FIG. 19E is a bottom view showing the opposing L-shaped sliders with the right side slider at the fully retracted position and the left side slider at the fully extended position.

FIG. 23 is a top view illustration of the drill adapter of FIG. 22.

FIG. 24 is a bottom view representation of the drill adapter of FIG. 22.

FIG. 28 is a side cross-section representation of the drill accessory.

FIG. 34 is a right side view of still yet another embodiment of a drill attachment of the present invention showing internal mechanisms powered by a hand drill.

FIG. 35 is a top view of the attachment of FIG. 34 showing internal mechanisms, removable handle and enlargement showing hexagon shaft and retainer clip.

FIG. 38 is the same as FIG. 34 except in the retracted position.

FIG. 39 is the same as FIG. 35 except in the retracted position.

FIG. 40 is a perspective exploded view of the attachment of FIG. 34 showing internal parts.

DETAILED DESCRIPTION OF THE INVENTION

Figure 1:
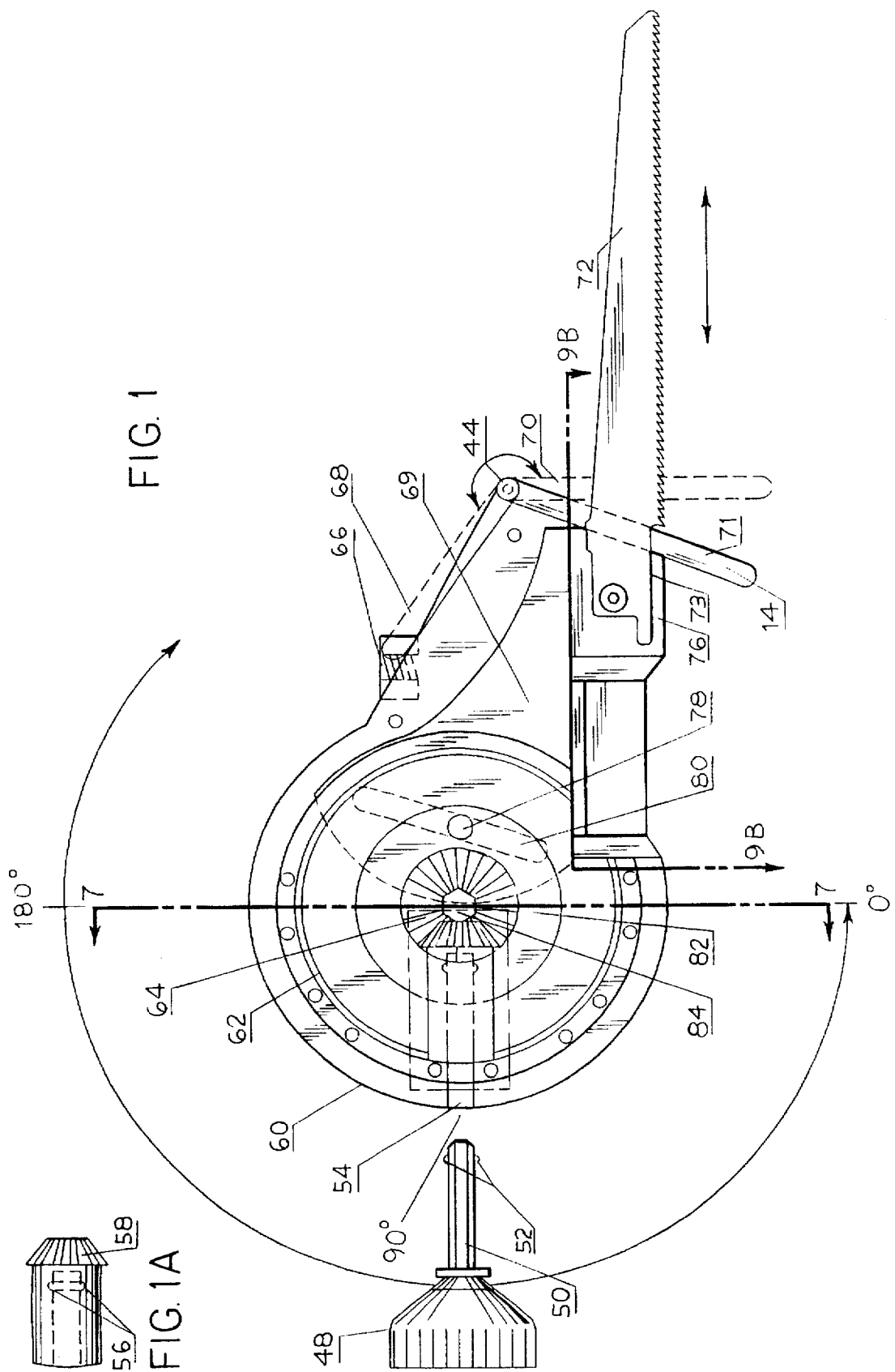
FIG. 1 is a right side view showing the internal mechanisms of a drill tool or adapter in accordance with an exemplary embodiment of the present invention. As shown, the drill chuck can revolve around the drill adapter from 0 degrees to 225 degrees when inserted radially. The saw blade is in the extended position.
Figure 6:
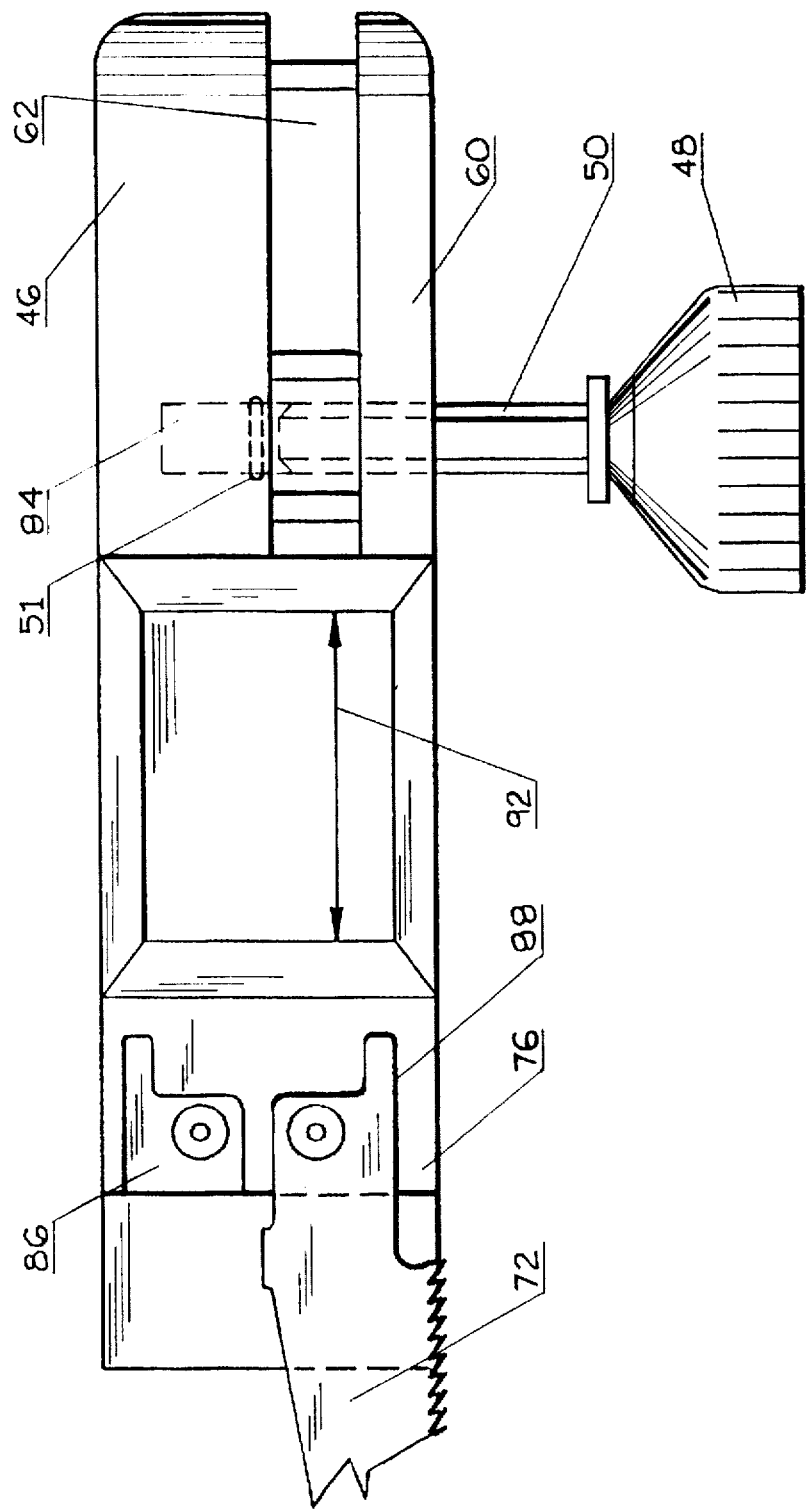
FIG. 6 is a bottom view of the adapter of FIG. 1 showing where two saw blade placement options for bottom flush cutting. A 5/16 inch hexagon drive pin is inserted on the right side of the drill adapter.

Referring to FIG. 1 of the drawings, an exemplary drill adapter or tool 10 uses a 5/16 inch hexagon drive shaft or pin 50 that mounts into any 3/8 inch drill chuck 48. Opposing ball catches 52 on the shaft 50 releasably lock the sawing tool to the drill. An annular recess 56 receives the ball catches 52 on the hexagon shaft 50 when inserted. As power is applied to the drill motor, rotation of chuck 48 causes rotation of shaft 50 which causes rotation of a bevel gear 58, a bevel gear 64, and a flywheel 82 attached to bevel gear 64. An eccentric peg 78 is attached to the flywheel 82. Peg 78 is received in an elongated angled slot 80 which has been milled out of a drive arm 69. As the eccentric peg 78 rotates around the axis of the bevel gear 64, the drive arm reciprocates. In accordance with one example, the reciprocating stroke distance 92 on this tool is about 1½ inches as shown in FIG. 6.

Figure 4:
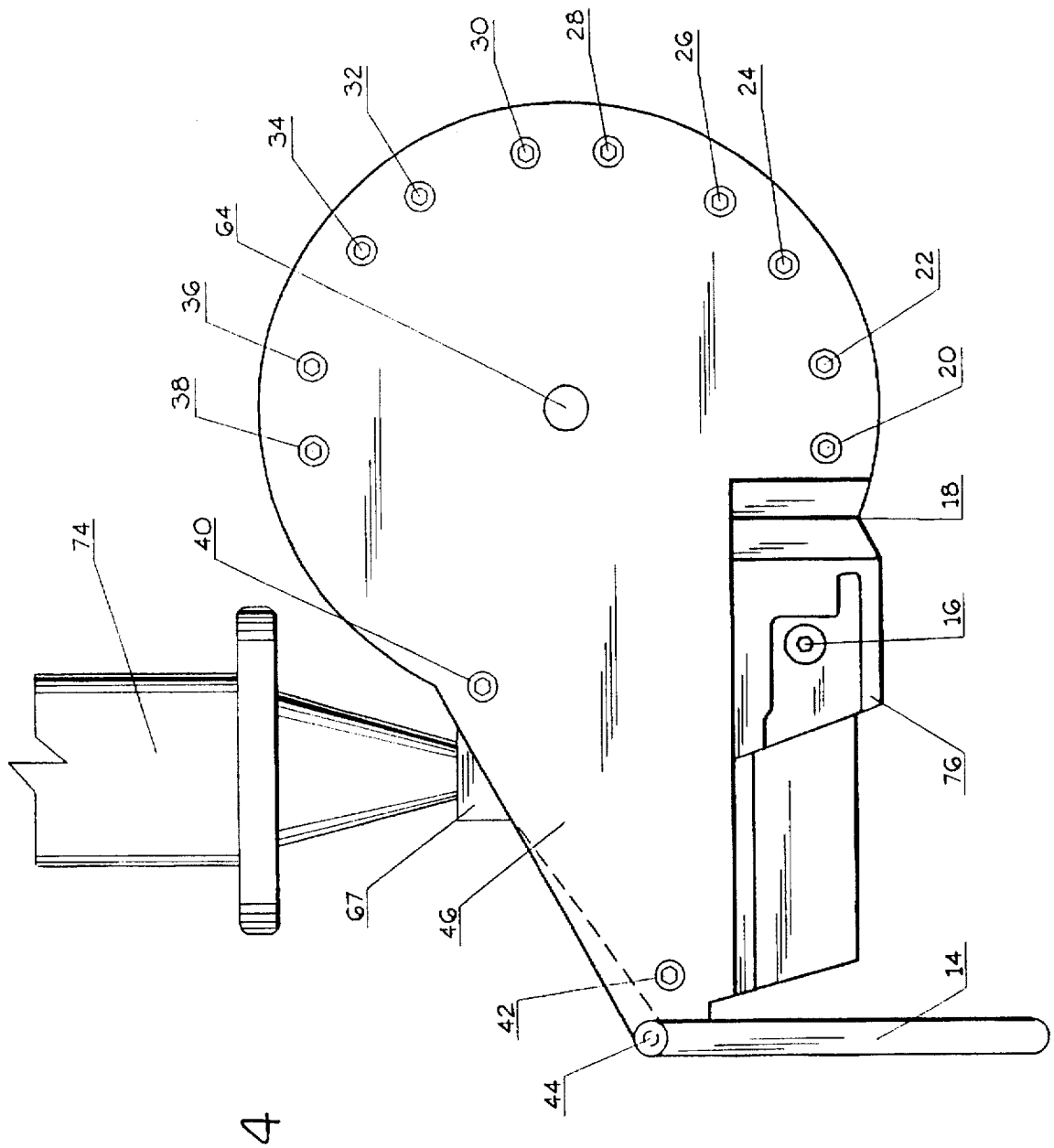
FIG. 4 is a left side view of the drill adapter of FIG. 1 with the mounting screws strategically placed for radial insertion stabilization. The saw blade is removed from the left side and the blade mount is shown in the retracted position. The handle is attached on the top part of the tool and the flip fence is in the down position.

Referring to FIG. 4 of the drawings, a series of screw pairs 20 and 22, 24 and 26, 28 and 30, 32 and 34, and 36 and 38 not only hold the two halves of casing 46 of the tool together, but also serve as guidance pins to selectively retain the 5/16 inch hexagon shaft 50 (FIG. 1) from orbiting the tool. Referring back to FIG. 1, a dust ring 62 orbits with bevel gear 58 assembly to keep foreign debris out of inside of the tool.

FIG. 1 shows the drive shaft 50 about to be inserted at 90 degrees. The range of radial insertion is from 0 degrees on the bottom of the tool to up to 225 degrees. A saw blade 72 is mounted on the right side of the tool by a small but very strong set screw 16. A U-shaped slider 76 has precise millwork (mounting recesses) done in four locations 73, 90, 86 and 88 to hold the saw blade securely in place.

A flip fence or rotatable shoe 14 pivots at point 44. When a saw blade is mounted on either the right or left side, the flip fence should be in the downward position 70 or 71. The flip fence 14 in this position works great for plunge cuts.

When flush cutting on either the right or left bottom position 86 or 88 (FIG. 6), the flip fence 14 should be locked in the upward position 68 (FIG. 1). A top handle location 66 is designed for handle 74 to protrude straight upward when installed (FIG. 4).

Figure 2:
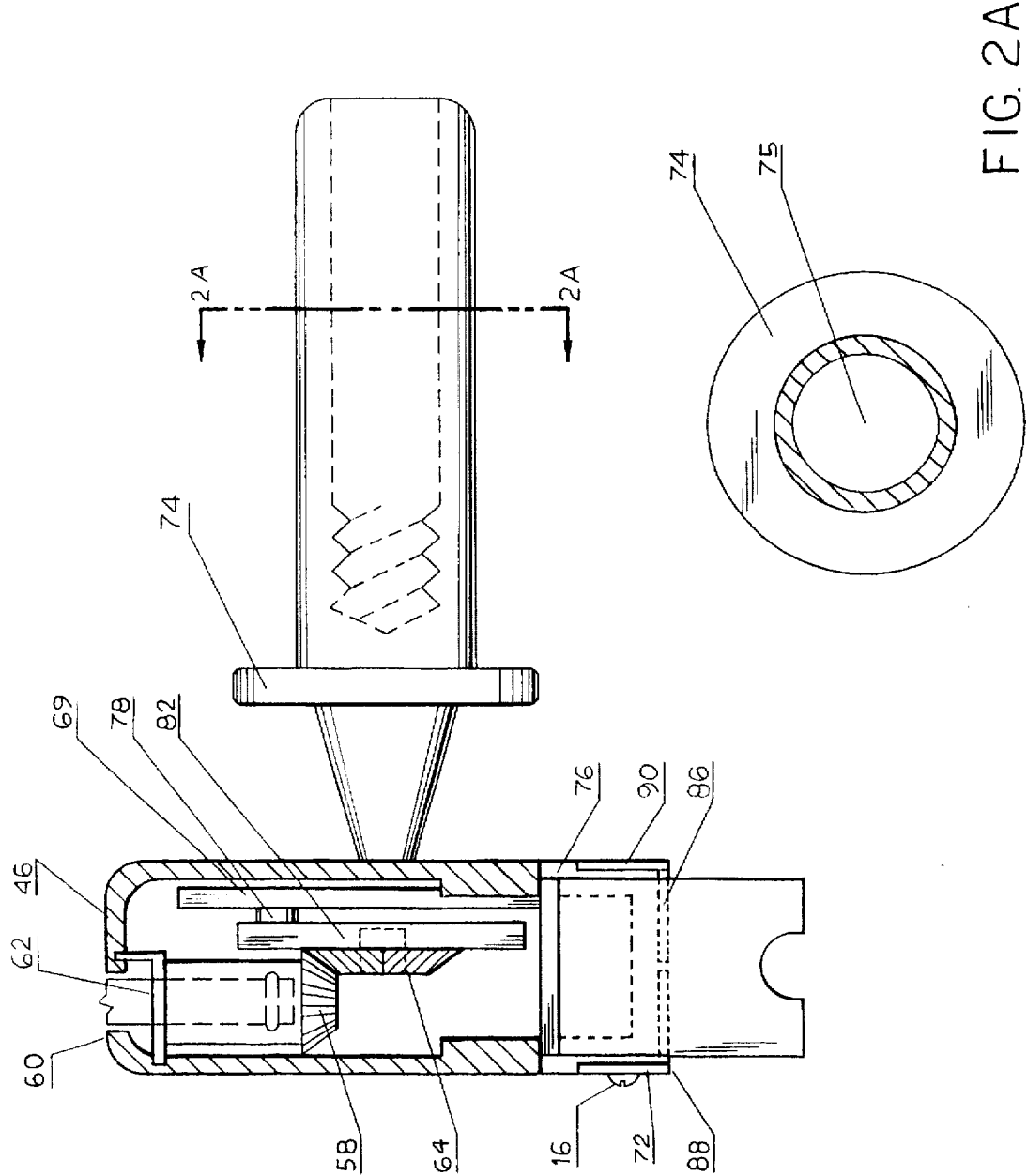
FIG. 2 is a front plan view illustrating the adapter of FIG. 1 with the flip fence in the downward position and the handle attached to the left side of the tool. Partial cross-section of the internal parts shows the bevel gears and drive arm.

Referring to FIG. 2, the adapter 10 includes a casing having a right hand half 60 and a left hand half 46. The flywheel 82 has the bevel gear 64 attached. Eccentric peg 78 is shown in the up position. A drive arm 69 glides along the left hand half 46 of the case. The handle 74 shown in the side mount helps stabilize the tool during use.

Referring to FIG. 2A, a threaded hole 75 in handle 74 is made to receive a threaded extension pole. The handle 74 can be removed from the left side of the tool by simply unthreading. Referring to FIG. 4, the handle 74 is threaded into the top of the drill adapter 10. The handle 74 may have a swivel intermediate its ends. Such handles are commercially available as paint roller handles in yellow plastic with a bolt and wingnut which allow the user to loosen the wingnut and angle the end of the handle from 90 degrees to 180 degrees as desired or to meet space requirements. Also, the end of the handle includes large course threads to receive an extension pole or handle. A swivel handle allows the user to reach and cut items over 9 feet high using the tool in a standing position.

Referring back to FIG. 2, the saw blade 72 is mounted on the right side position 73 and can be moved to the left side at a location or recess 90. The bottom saw blade mounting locations include left mount 86 and right mount 88. Saw blade 72 is mounted on the right side of the tool by a removable set screw 16. Spare set screws can be left in their appropriate holes to keep foreign objects out. The flip fence 14 is in the down position.

Figure 3:
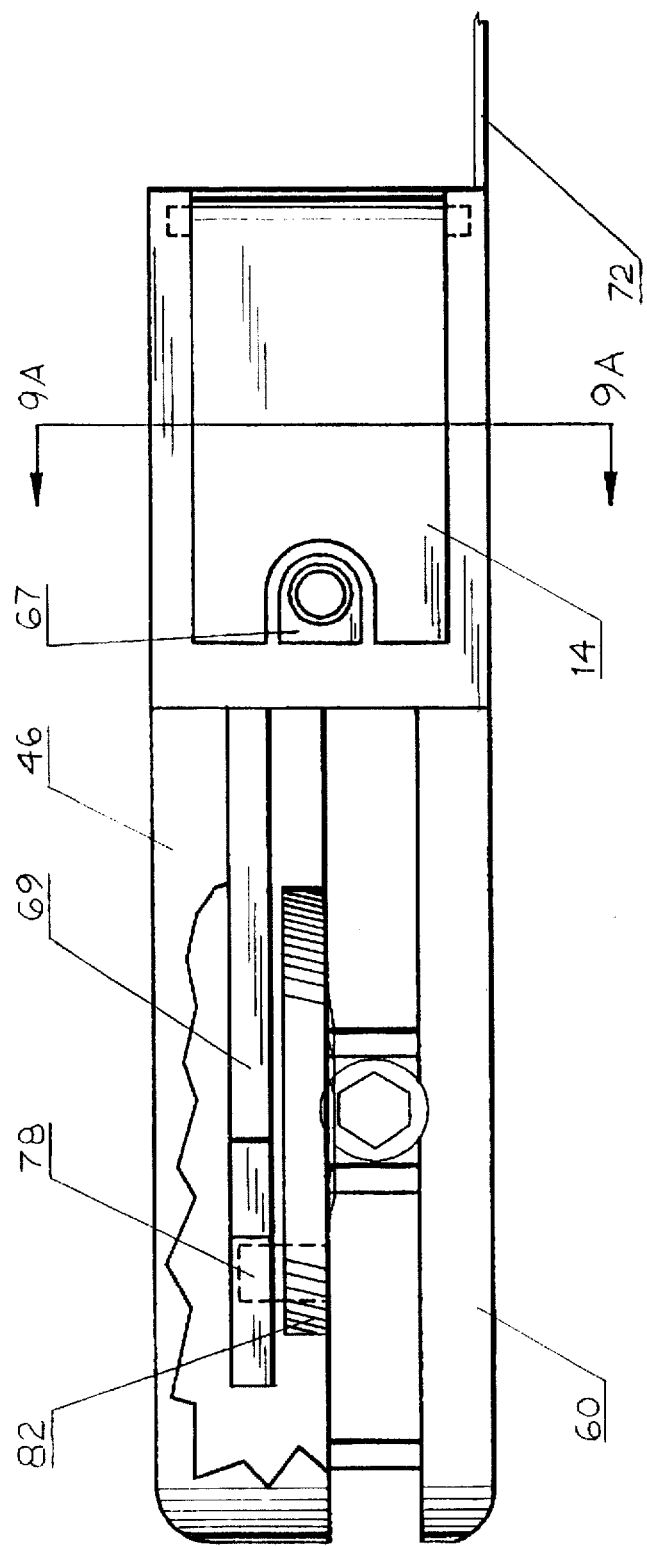
FIG. 3 is a top view of the adapter of FIG. 1 with the flip fence in the upward position. A cut-away illustrates the drive arm, flywheel, eccentric peg and bevel gear. The saw blade is mounted on the right side.

Referring to FIG. 3, a cut away of casing 46 shows the internal mechanisms including drive arm 69, eccentric peg 78, and flywheel 82. Saw blade 72 is mounted flush in the right side mount 73. The flip fence 14 is in the up position.

Referring to FIG. 4, the flip fence 14 is dangling in the downward position. One of four set screws 16 is in place without a saw blade. Void space 18 is designed to avoid pinching injury. The pair of screws 20 and 22 act as a retainer for the hexagon shaft 50 when being powered from 0 degrees or the bottom. The pair of screws 24 and 26 act as a retainer for the hexagon shaft 50 when powered at 45 degrees. The pair of screws 28 and 30 act as a retainer for driving the tool at 90 degrees. The pair of screws 32 and 34 act as a retainer for using the tool at 135 degrees. Lastly, the pair of screws 36 and 38 on the top of the casing serve as a retainer to use the tool at 180 degrees. All of these screws mentioned and screws 40 and 42 hold the tool casing or housing together. The radial access feature continues on and reaches its stopping point just past 225 degrees. The threaded hole 66 is to receive the handle 74. Screws 40 and 42 hold the front portion of the sawing tool together. The U-shaped slider 76 is shown in the retracted position.

Figure 5:
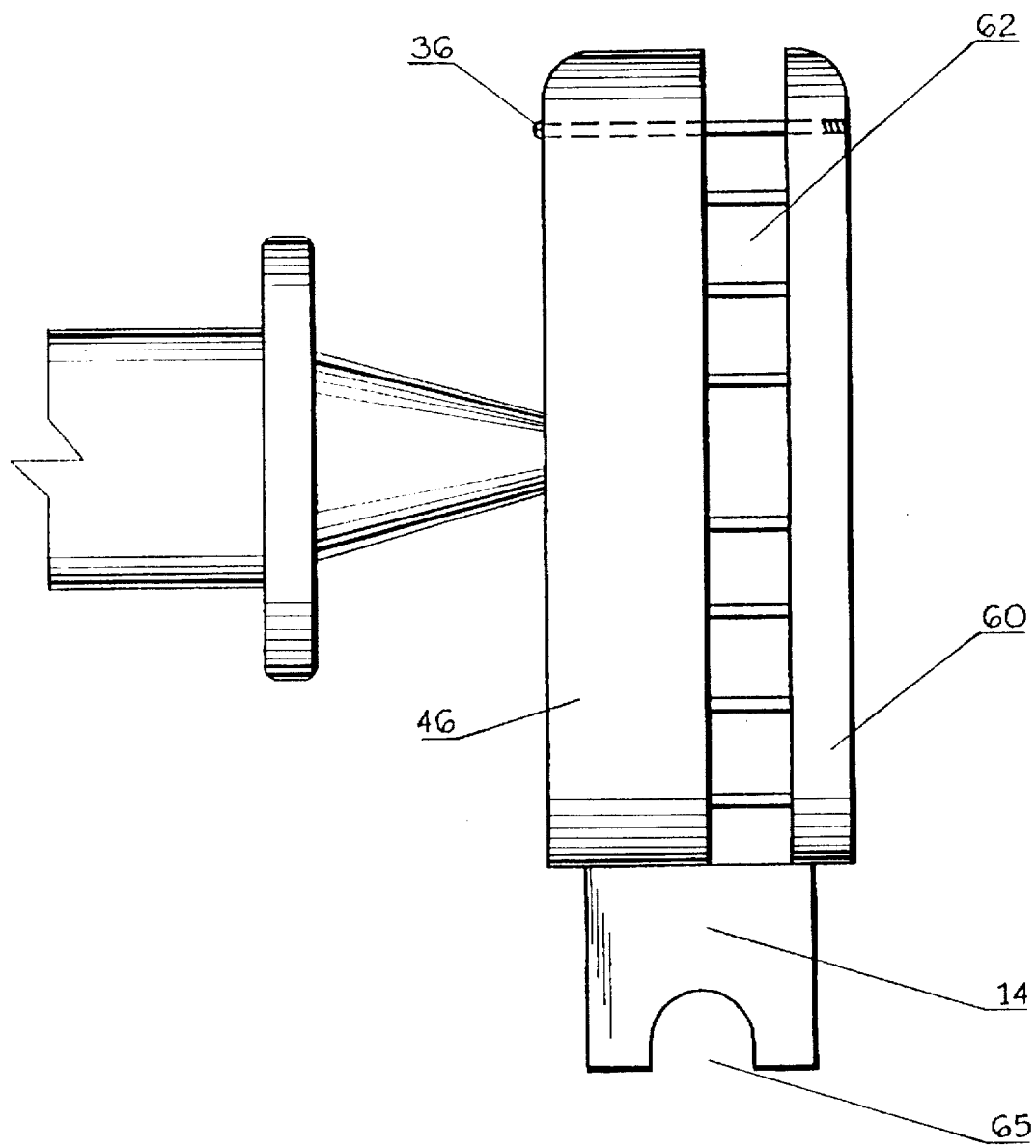
FIG. 5 is a back view of the adapter of FIG. 1 with the flip fence in the downward position and the handle mounted on the left side of the tool.

Referring to FIG. 5 and looking at the backside of the tool fully assembled, screw 36, one of the twelve screws that hold the tool together, displays the size and length of the screws. The dust ring 62 covers the opening between the right side 60 of case and the left side 46 of the case. The lower half of flip fence 14 can still be seen from the back. Void space 65 is necessary to avoid hitting threaded stub 67 as seen in FIGS. 3 and 4.

Referring to FIG. 6, the bottom of tool 10 is shown with the saw blade 72 mounted in location 88. The other bottom flush cut location 86 is empty. The 1½ inch or more maximum blade stroke distance 92 is shown. The drill chuck 48 along with the 5/16 inch hexagon shaft 50 are oriented perpendicular to the tool case with shaft 50 being inserted into opening 84 in bevel gear 64. Since opening 84 is in gear 64, this drive is geared on 1:1 ratio. Depending on the predicament, the user would still be able to accomplish flush cutting at this angle.

Referring to FIG. 7, this is a cross-section taken along line 7—7 in FIG. 1 to show the bevel gears 58 and 64, and dust ring 62.

FIG. 8 shows the front view of tool 10 without a handle or blade.

In accordance with one example of the present invention, the adapter is constructed as shown in FIGS. 1–8, sized to receive a conventional reciprocating saw blade, and has outer dimensions of about 6 inches long, 4 inches high, and 1½ inches wide.

In accordance with another example of the present invention, an alternative embodiment of the adapter is constructed as shown in FIGS. 9A–9E.

In accordance with yet another example of the present invention, the adapter has dimensions of about 3¼ inches long, 2 inches high, and ¾ of an inch wide, and is constructed as shown in FIGS. 10–19.

With reference to FIGS. 1–8 of the drawings, the vibration caused by reciprocation of blade yoke 76, blade 72, drive arm 69, and pin 78 can be reduced by counterbalancing flywheel 82.

Figure 9C:
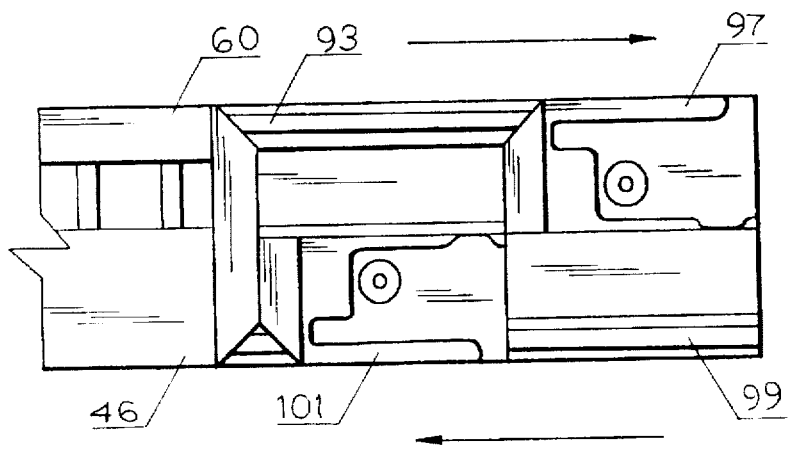

FIGS. 9A–9E relate to an alternative or option for reducing vibration by splitting the yoke 76 depending on the needs of the user and manufacturer. Referring to FIG. 9A, a dovetail design 93 runs the full travel distance of the stroke, and a rack gear 95 is screwed to an L-shaped slider 97. Another dovetail design 99 runs the full travel distance of the stroke. The other half of the blade mount or yoke, is an L-shaped slider 101. A pinion gear 103 meshes with the rack gear 95 and a rack gear 96 on drive arm 69.

FIG. 9B is a cross-section viewing downwardly racks 96 and 95 and pinion gear 103.

Figure 9D:
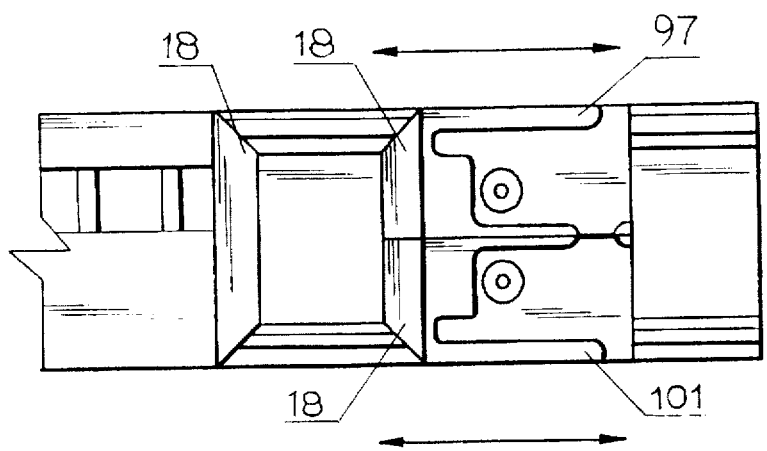
Figure 9E:
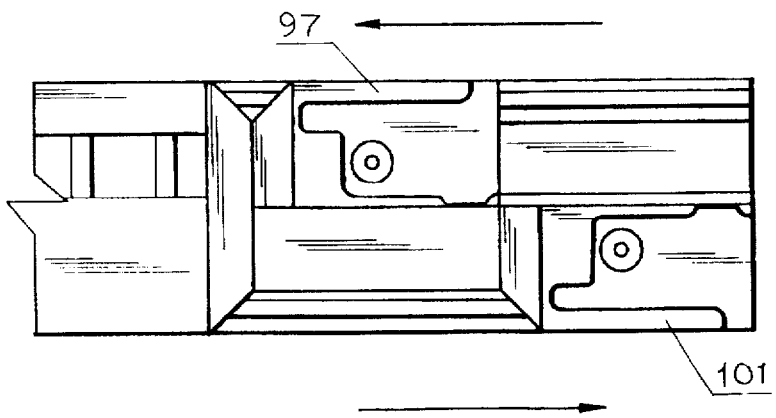

FIGS. 9C, 9D, and 9E show the bottom of opposing L-shaped sliders 101 and 97. Set screws 16 hold the saw blade in position. There are four set screws 16 that remain in their designated holes to keep the threads clean. The angled surfaces 18 are designed not to create pinching injury.

FIGS. 10–19 are similar to FIGS. 1–9 of the drawings, with the exception that an alternative embodiment of the adapter generally designated 150 includes blade mounting recesses 152, 154, 156 and 158 adapted to receive a jigsaw style or type of blade 160.

Figure 21:
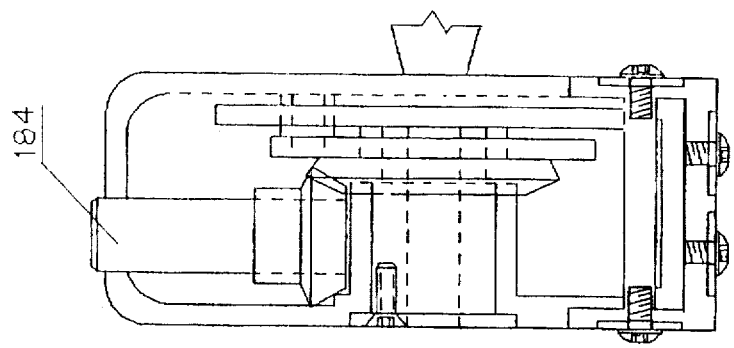
FIG. 21 is a front cross-section illustration of the drill adapter of FIG. 20.
Figure 20:
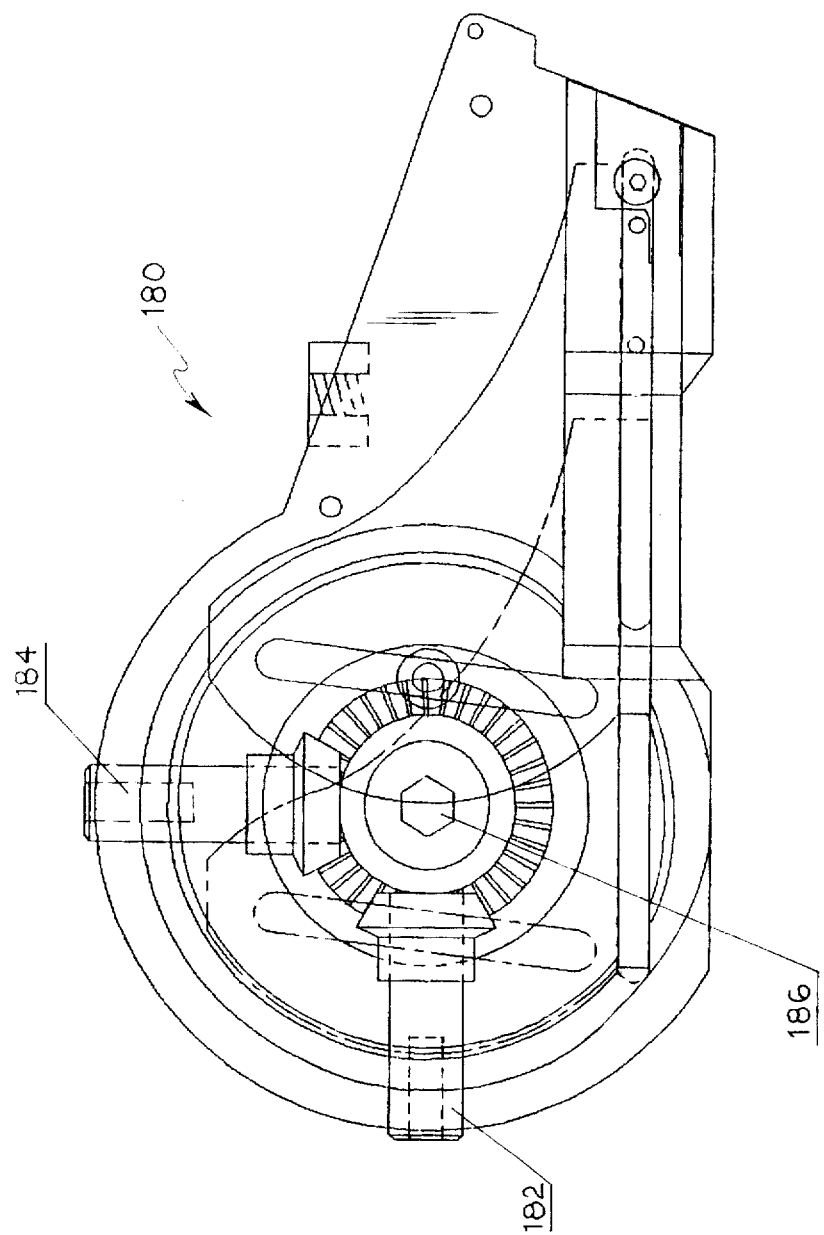
FIG. 20 is a right side view representing yet another embodiment of the tool or adapter of the present invention having two fixed radial drive points, one at 90 degrees and one at 180 degrees, as well as a side drive port.

With reference to FIGS. 20 and 21 of the drawings, yet another embodiment of the drill adapter of the present invention is generally designated by the reference numeral 180 and shown to include fixed radial drive ports 182 and 184 at 90 degrees and 180 degrees, respectively. The adapter or device 180 further includes a side drive port 186. Each of the radial drives 182 and 184 is mounted for rotation, adapted to receive a hexagon drive pin, and has a small diameter bevel gear which mates with a large diameter bevel gear operatively connected to drive port 186.

Although the embodiment shown in FIGS. 20 and 21 of the drawings includes three drive ports, two radial and one side drive port, it is contemplated that in accordance with the present invention a drill adapter may include a variety of radial drive ports fixed or movable in combination with one or more side drive ports.

Exemplary Parts List

50: Steel hexagon shaft, 2½ inches×5/16 inch, with ball catches #52.
58: Steel bevel gear, ¾ inch×¼ inch, with female sleeve, 5/16 inch.
82: Steel weighted flywheel, 2 inches×¼ inch, with steel bevel gear, 1 inch×¼ inch, attached and a bronze eccentric peg attached.
69: Steel angled slot drive arm, 4 inches×2½ inches×¼ inch.
60: Right side of case, heavy duty plastic.
46: Left side of case, heavy duty plastic.
74: Hollowed-out handle with internal threads, finger stop, heavy duty plastic.
14: Pivoting flip fence, high density, top quality aluminum.
76: U-shaped slider, steel alloy.
78: Eccentric peg, brass or bronze.
72: Saw blade. This tool will accept the majority of existing brands of saw blades, reciprocal and jig type.
62: Circular dust ring, heavy duty plastic.
20, #22, #24, #26, #28, #30, #32, #34, #36, #38, #40 and #42: screws off-the-shelf, 1½ inches long, ⅛ inch thick, steel alloy.
16: Button head screws off-the-shelf, ¼ inch long, 3/32 inch thick.
95, #103 and #69: Rack and pinion gears, steel alloy.
97 and #101: L-shaped sliders, steel alloy.

The drill adapters of the present invention are preferably designed to receive and use conventional saw blades, for example reciprocating saw blades, jigsaw blades, saber saw blades, or the like for cutting wood, metal, ceramics, PVC, and the like including Lenox, Milwaukee, DeWalt, Black and Decker, Mikita, and other brands of off-the-shelf saw blades.

Figure 22:
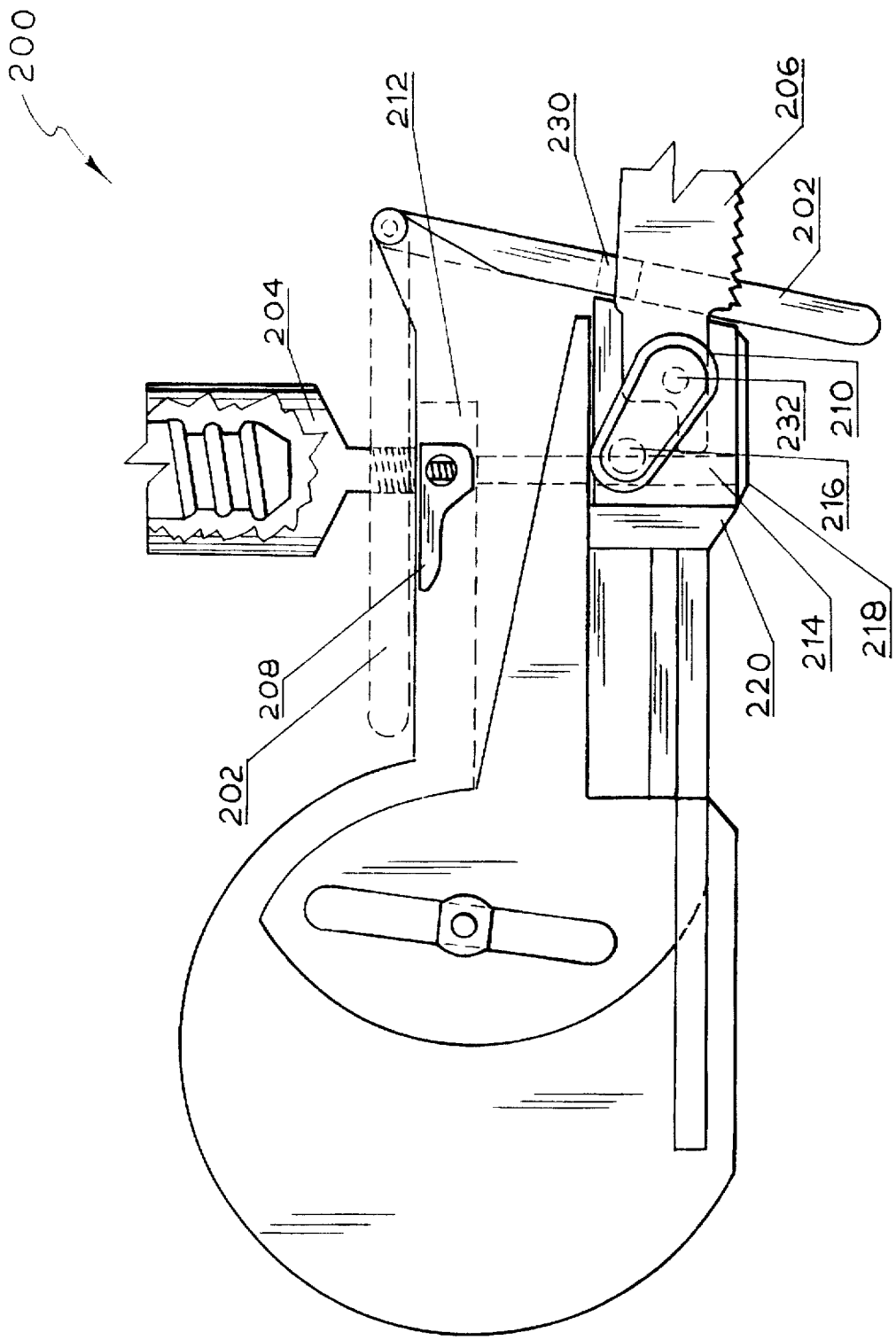
FIG. 22 is a side view representation of yet another embodiment of the drill adapter of the present invention including a quick blade release assembly.
Figure 27:
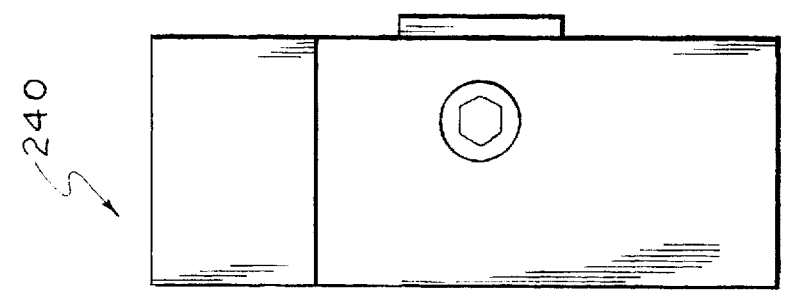
FIG. 27 is a back plan view illustration of the drill accessory of FIG. 28.
Figure 26:
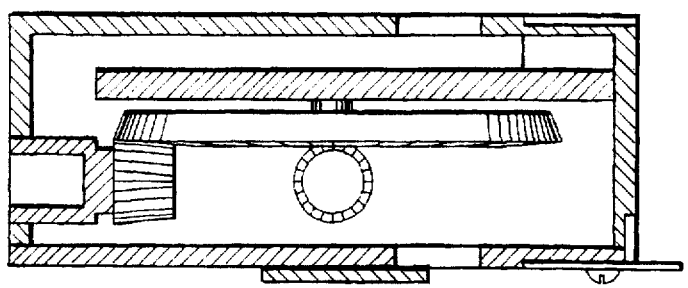
FIG. 26 is a front cross section view representing the mechanisms of the drill accessory in accordance with another exemplary embodiment of the present invention taken along line 26—26 in FIG. 28.

FIG. 22 shows a preferred embodiment of a device 200 from the right side thereof with several internal parts shown for the sake of clarity. A flip fence 202 is shown in the downward position. The upper dotted line position of the flip fence 202 is shown with a dual purpose handle 204 inserted in the flip fence 202. The tool 200 is shown in the fully extended position with a saw blade 206 extended forwardly and mounted on the right side of the tool. A quick release lever 208 is shown in a lower blade lock position.

FIG. 23 is a view looking down on the tool 200 of FIG. 22. A side blade clamp 210 is shown with the saw blade 206 secured in place thereunder. A finger space or recess 212 in the upper side of the tool enables the user to access and quickly disengage the release lever 208 by simple upward lift. By doing this, a square shaft 214 operatively connected to the lever 208 moves downwardly just enough to unlock a round shaft 216. Side blade clamp 210 and a lower blade clamp 218 are moved away from a U-shaped slider 220 to install or remove a saw blade.

As shown in FIG. 24, the bottom side of the tool 200 displays the 1½ inch or more of travel 219 of the slider 220 and blade 206. Saw blade clamp 218 has a triangular shape to hold the blade in either bottom position 222 or 224. Blade clamp 218 is welded to the base of square shaft 214 which extends upwardly through the internal part of the tool to the quick release lever 208. Small bosses or protrusions 226 and 228 on lower blade clamp 218 protrude through an opening in the saw blade and into the U-shaped slider 220 when a blade is inserted in position 222 or 224 under blade clamp 218.

Although saw blade 206 is shown mounted on the right side of the tool 200 and held in place by blade clamp 210, it is to be understood that the blade 206 may be mounted in any one of the four blade mounting positions on the U-shaped slider. The blade clamps 210 and 218 are both attached to the tool during use.

Figure 25:
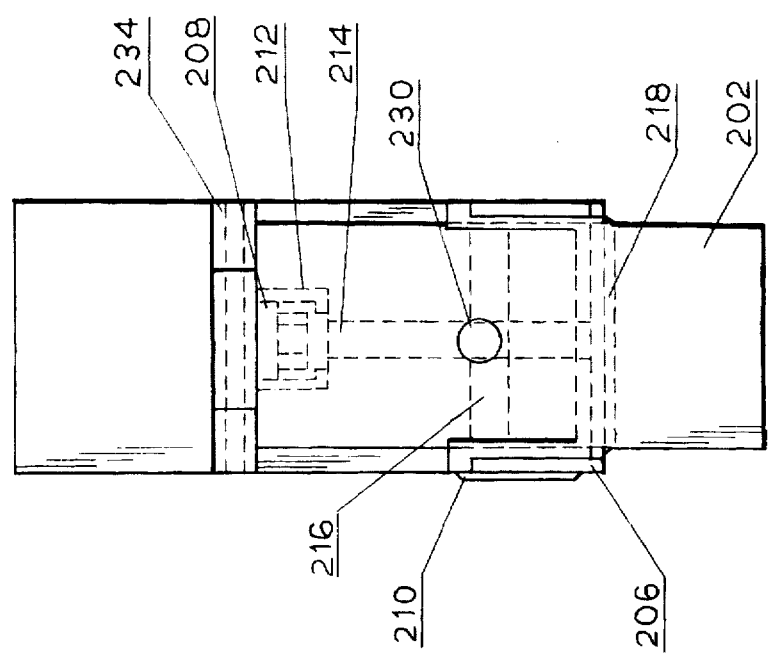
FIG. 25 is a front view representation of the drill adapter of FIG. 22.

FIG. 25 shows the front of the tool 200 with dash lines representing the square shaft 214 and intersecting round shaft 216 which have notches milled therein to interlock one with the other. A round internally threaded hole 230 in flip fence 202 is utilized in the upward position of the flip fence to attach handle 204 for stabilizing the tool during use. The saw blade 206 is mounted in one of the four positions on the U-shaped slider 220. In this view, blade clamp 210 secures saw blade 206 to the right side of the tool 200. The side clamp 210 includes a small boss or projection 232 adapted to protrude through an opening in the saw blade and into the U-shaped slider 220 when the blade is located in the right side position.

Although the device 200 is shown with the side blade clamp 210 mounted on the right side of the device, it is to be understood that the side clamp 210 can be removed and placed on the left side of the device to lock a blade in position on the left side of the U-shaped slider 220. One does this by lifting the quick release lever 208 and releasing horizontal shaft 216 with respect to vertical shaft 214. The side clamp 210 is removed from the right side of the device and round shaft 216 is inserted into the left side of the device to a point where at the corresponding milled surfaces on shafts 214 and 216 are aligned. A saw blade is placed under the side clamp 210 with the projection 232 in position to be received in an opening in the saw blade and the quick release lever 208 is lowered to its blade locking position.

FIGS. 26–33 of the drawings show another embodiment of a sawing device generally designated 240 and which is attachable to an electric, pneumatic, or cordless drill 242 for converting rotary motion to reciprocal or linear motion for driving a saw blade 244. The drill 242 includes a drill chuck 246 adapted to receive one end of a hexagon shaft or drive pin 248 the other end of which is adapted to fit each of three female drive sockets or ports 250, 252, and 254. Drive sockets 250 and 252 are operatively connected to respective small bevel gears 256 and 258 which mesh with a larger bevel gear 260. Socket 254 is operatively connected to the center of the larger bevel gear 260. An eccentric peg 262 is mounted on the larger bevel gear 260 and received in an elongate slot 264 in a drive arm 266. The drive arm 266 slides back and forth along the length of the tool guided and supported by the tool housing 268. The saw blade 244 is attached to one of three or more respective blade positions on a slider 270 operatively attached to drive arm 266. The blade 244 is attached to the slider 270 by a set screw 272.

A hand safety stop or surface 274 prevents the user from accidental injury on the saw blade 244. A removable handle 276 is secured into a threaded opening 278 on either side of the tool or a threaded opening 280 on the top side of the tool for stabilizing the tool during use.

The tool 240 can be driven from the rear by inserting the drive pin 248 into the corresponding receiving recess 250, driven from the top by inserting the drive pin 248 into the corresponding receiving recess 252, or driven from the side by inserting the drive pin 248 through an opening 282 in the housing 268 and into the corresponding recess 254. In this manner, the tool is highly versatile and can be used to cut, file, sand, or the like many different materials in many different applications including hard-to-reach or awkward locations of the material to be cut.

The angled elongated slot 264 gives the tool a very unique stroke with the speed of the inward or cutting stroke being faster than the outward or cleaning stroke. A third small bevel gear 284 may be added to further stabilize the larger bevel gear 260 within the housing 268. The slider 270 and housing 268 have adjoining angled or mitered surfaces 286 at the rear of the slider 270 along the right, left and bottom of the tool to help prevent the tool from pinching the user during use. A flip fence or shoe 288 has two working positions, the up position for flush cutting with the blade mounted on the bottom of the slider 270, and a down position for use with the blade mounted to the right or left side of slider 270. The flip fence 288 pivots about an axis 290 on the front of the housing 268.

Figure 29:
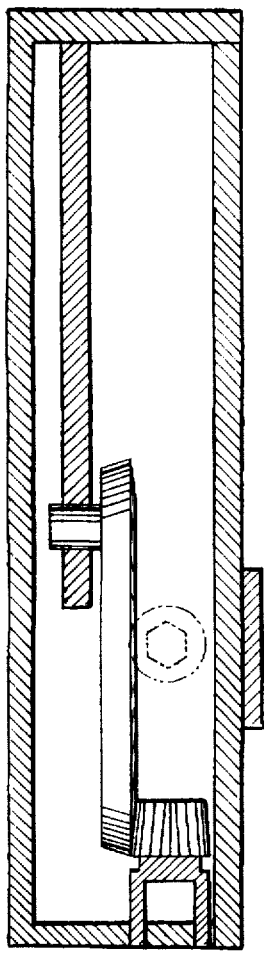
FIG. 29 is a top cross-section illustration taken along line 29—29 in FIG. 31.
Figure 30:
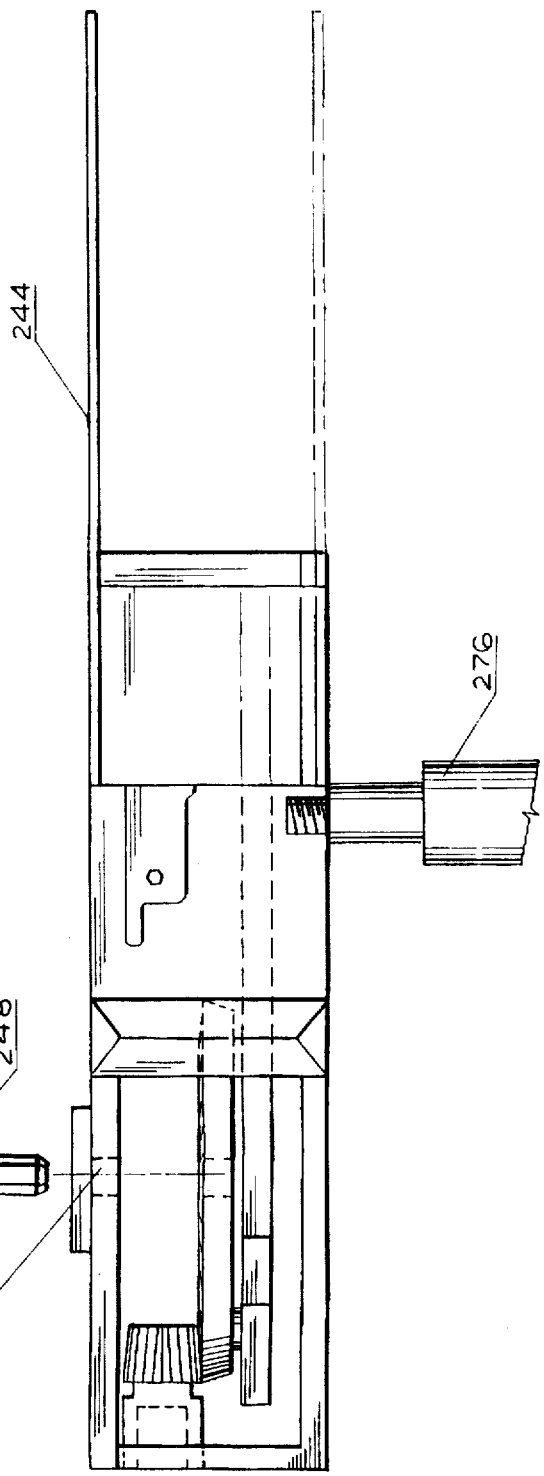
FIG. 30 is a bottom plan view representation of the accessory of FIG. 28 with a portion of the base removed to show internal parts.
Figure 31:
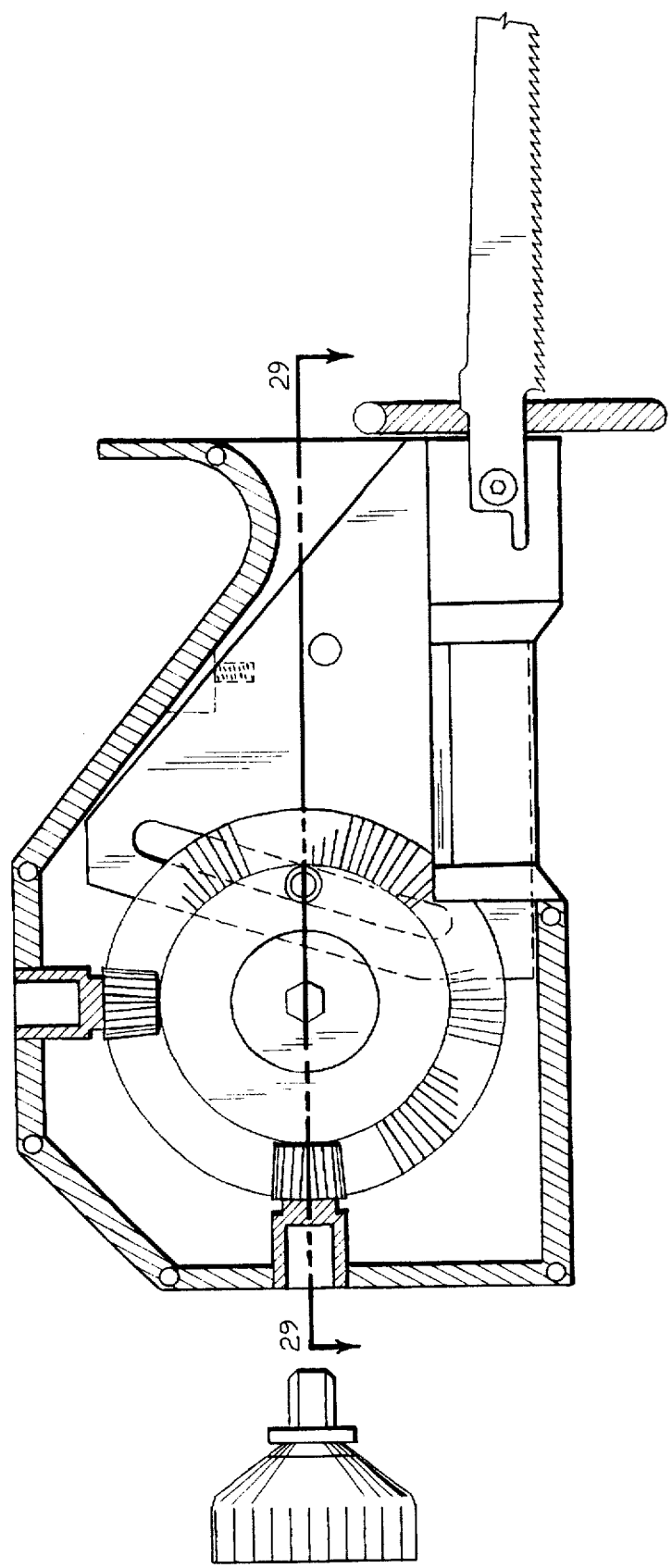
FIG. 31 is a right side cross-section illustration of the accessory of FIG. 28 with the blade of the drill accessory in its extended position.
Figure 33:
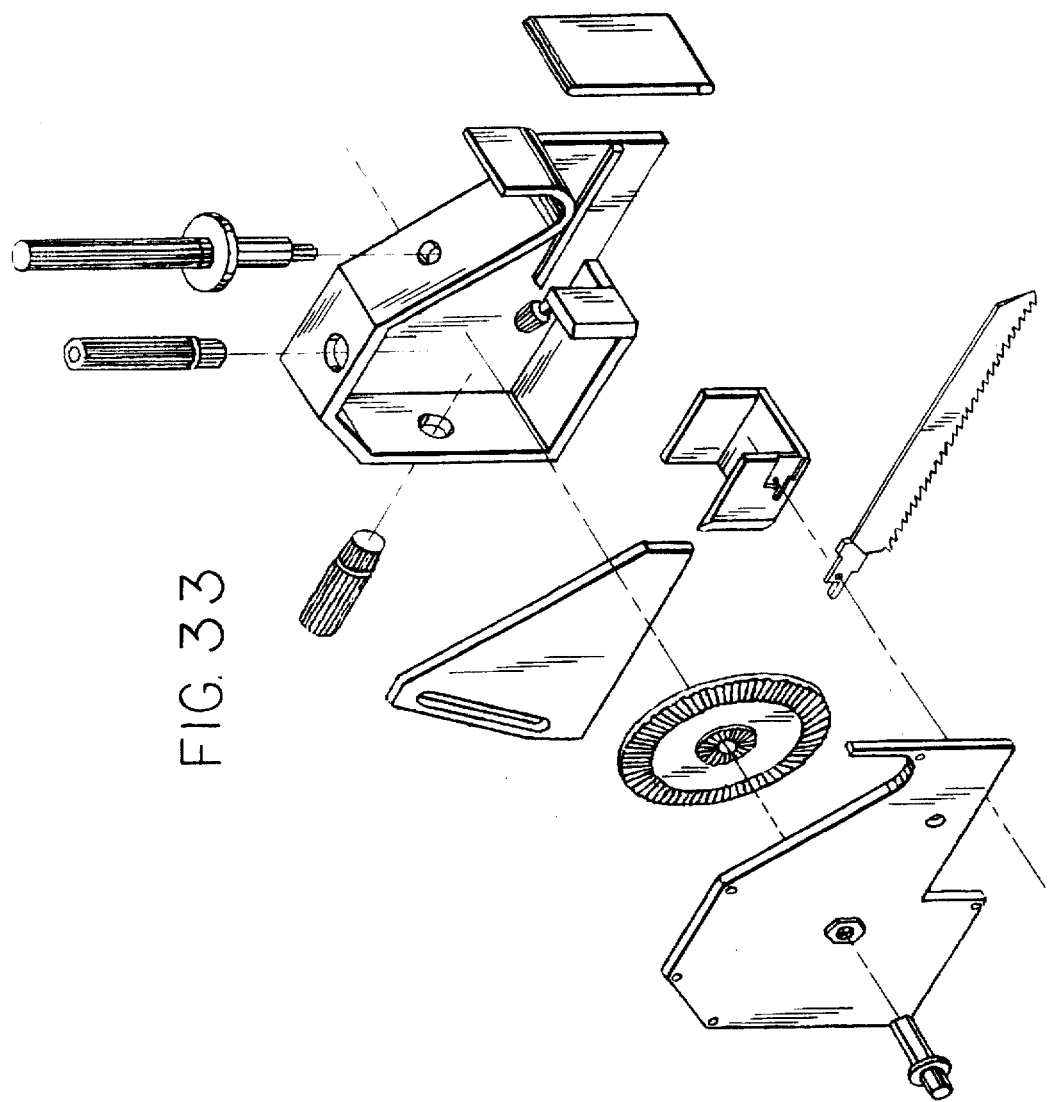
FIG. 33 is an exploded perspective view of the tool of FIG. 32.
Figure 32:
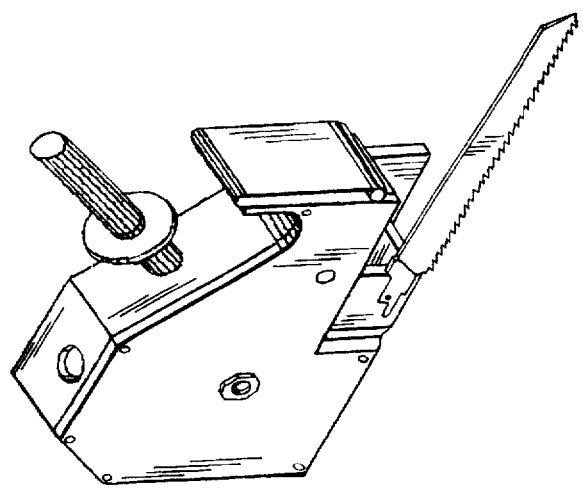
FIG. 32 is a perspective view of the tool of FIG. 28 fully assembled.
Figure 37:
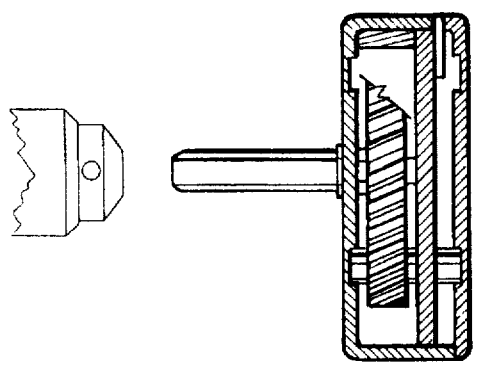
FIG. 37 is a cross-sectional view of the attachment of FIG. 34 showing housing and inserted hex shaft in place.
Figure 36:
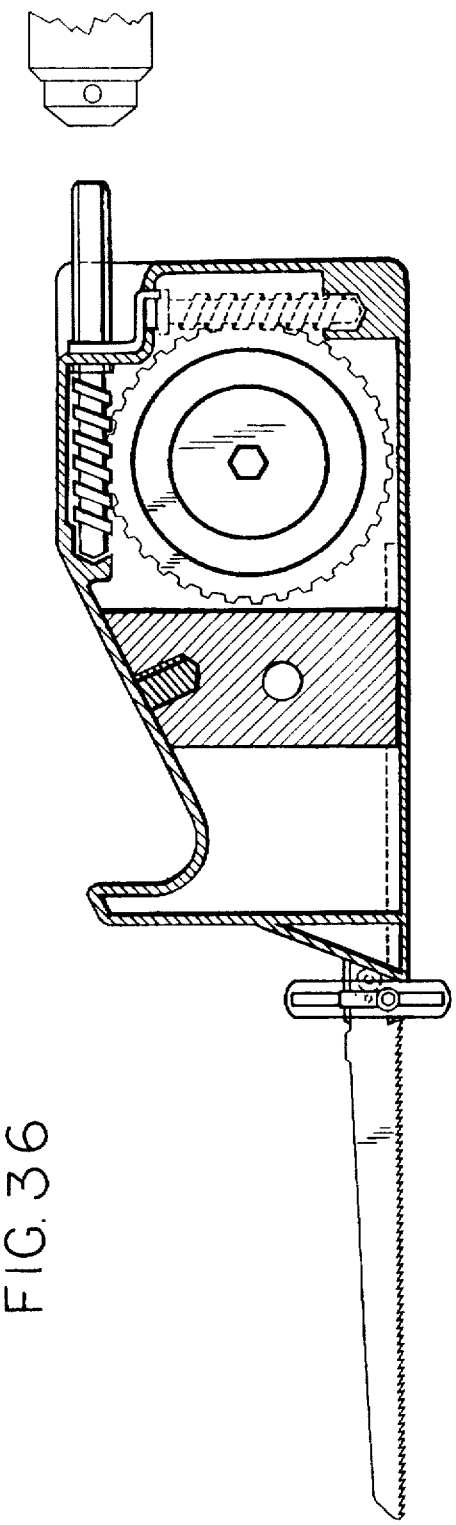
FIG. 36 is an opposing view from FIG. 34 showing internal mechanisms, quick release fence feature, and hex fitting on helical gear.
Figure 41:
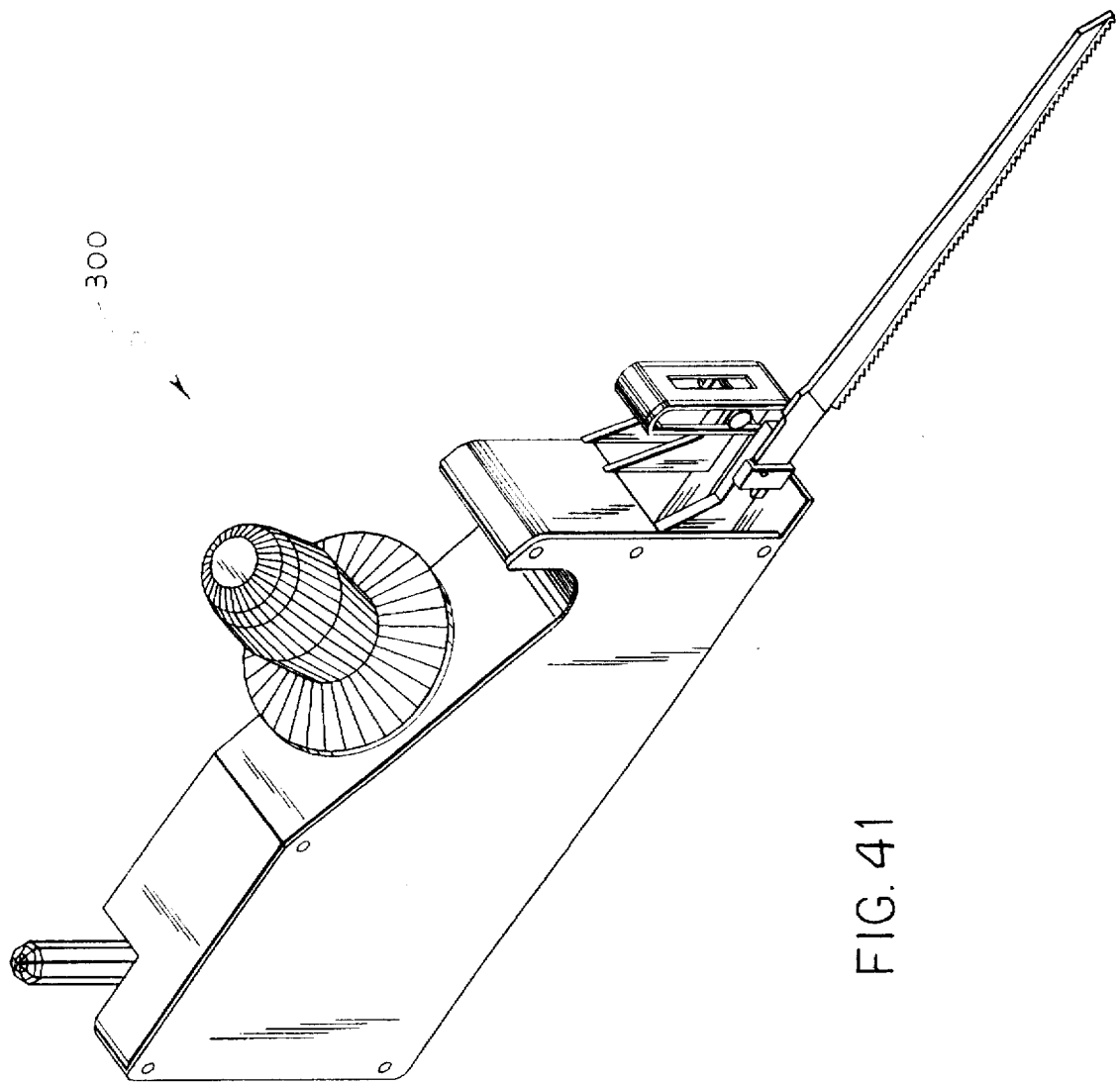
FIG. 41 shows a perspective view of the drill attachment of FIG. 40 assembled.

FIGS. 28, 30 and 32 of the drawings show the drive arm 266, slider 270, and blade 244 in the retracted position. FIGS. 29 and 31 of the drawings show the drive arm, slider and blade in their fully extended position. FIGS. 32 and 33 show the tool 240 assembled and disassembled, respectively.

In accordance with one example, the drill accessory has a compact metal or sturdy plastic housing with a metal bevel gear arrangement which transforms rotation of a drill into a reciprocating sawing motion by activating an eccentric pin which in turn propels a drive arm connected to a cutting blade by a slider. The drill accessory may be powered by a cordless, electric or pneumatic drill motor and provides for a reciprocating sawing as well as flush cut sawing action. By selecting one of the plurality of different drive ports, the user can control the gearing ratio and thereby use the direction and speed control of the drill together with the selected gear ratio to safely cut various types of material in unwieldy places or remote areas. In accordance with a particular embodiment, the device has three different female drive ports or drive sockets, each adapted to receive one end of a reversible male hexagon drive shaft the other end of which is adapted to be received by a conventional drill chuck. In accordance with a particular example, the device includes three different blade mounting positions which are adapted to receive conventional saw blades and provide for three different flush cuts.

In some instances, the user may want to drill a starter hole before sawing. The reason being the back and forth motion of the saw blade may cause the blade to bounce erratically jumping off target and possibly bending or breaking the blade and the bouncing may cause pounding and jarring of the user until the blade has fully penetrated the material in question.

Reciprocating saws on the market vary in features, quality and cost. The majority of them have two speeds, high and low, and for an added cost a few have variable speed with no clutch setting. The present "Hand Over Fist" tool is totally powered by the drill motor which can be controlled if need be by the desired clutch setting. The reciprocating saws on the market have strokes per minute (S.P.M.) which on the two speed models start out at about 300 to 400 strokes per minute (S.P.M.) and increase up to 2600 strokes per minute (S.P.M.). With the variable speed drill of the present invention, the user can start out at a snail's pace if necessary.

Referring to FIGS. 34–41, a sawing device 300 is adapted to be operatively attached to an electric, pneumatic or cordless drill 302 for converting rotary motion to reciprocal motion for driving a saw blade 304. The drill or power source 302 has a chuck 306 adapted to receive one end of a hexagon shaft 308 the other end of which fits into a quad lead worm gear 310 that meshes with a helical gear 312 that has an eccentric peg 314 received in an elongated slot 316 in a drive arm 318. The drive arm 318 slides back and forth guided and supported by a guide block 320. The saw blade 304 is attached to the bottom or the side of the drive arm 318 by a bracket and set screw 322.

A hand safety stop 324 prevents the user from accidental injury on the saw blade. A removable handle 326 can be screwed into a threaded hole 328 on the top or threaded hole 330 on the left side of tool for stabilizing purposes.

Hex shaft 308 can also be inserted into a side female hex hole 332 in gear 312 to use the tool at 90 degrees from the drill motor. A locking or tension retainer clip 334 serves as a mount for worm gear 310 and as a dust boot to cover the other horizontal or vertical worm gear entry hole when not in use. Quad lead worm gear 310 can be removed from housing 336 by removing tension retainer clip 334 and can be vertically inserted at a dotted worm gear outline position 338. This provides a third drive angle for the tool 300. Also, the worm gear 310 can be removed to reduce the drag on the helical gear 312 when the hex shaft is inserted in the hex hole 332.

The device 300 also includes an adjustable fence or shoe 340. The blade may be attached to the drive arm 318 by a quick release assembly 342 as shown in FIG. 40.

In accordance with one example, the drill attachment 300 includes a compact metal housing having metal helical and worm gears which convert rotational motion to linear reciprocating motion by activating the eccentric pin which in turn propels the drive arm that is connected to the cutting blade. The cordless, electric or pneumatic drill motor 302 and the tool 300 together form a sawing, filing or sanding unit.

The tool 300 provides for controlled coupling of rotational energy from the drill motor to safely cut various types of material in unwieldy places or remote areas. The device 300 has three different female socket entries to receive the male hexagon shaft powered by a cordless, electric or pneumatic drill. The tool 300 has two sides designed for flush cutting or sawing.

The drill adapter 300 converts a cordless drill to a reciprocating saw and enables the blade drive arm to reciprocate and produce sawing action at various speeds, provides for the sawing of a variety of materials in confined areas by selecting one of nine configurations, has flush cutting features at controlled speeds and power ranges, and can work in conjunction with any quality cordless drill in remote locations.

The cordless or electric drill accessory 300 provides a portable hand-held drill driven tool for reciprocal cutting, is powered by the rotation delivered from a cordless, electric or pneumatic drill and saves time in the process of cutting procedures.

In accordance with one example, the cordless, electric or pneumatic drill device 300 enables a user to saw in a reciprocating action. The compact metal enclosure 336 houses one steel helical gear and two removable worm gears to move the eccentric peg and drive the arm and the blade. The rotation of the drill enters the tool by the removable hexagonal shaft which can be inserted into the tool at three different angles depending on the task. The worm gears mesh with the helical gear having the eccentric peg located inside the elongated slot of the blade drive arm. As the respective worm gear rotates, its speed is exchanged for torque in the helical gear and the rotation of the helical gear is converted to a linear reciprocating motion which drives the blade.

Whereas, the present invention has been described in relation to the drawings attached hereto, it should be understood that other and further modifications, apart from those shown or suggested herein, may be made within the spirit and scope of this invention.

SEQUENCE LISTING

Not Applicable.

What is claimed is:

1. An apparatus for converting rotary motion from a rotary power tool into a reciprocating motion of a saw, file, sander, or the like, comprising: a housing, a first gear mounted in said housing and having a peg mounted eccentrically thereon, a blade drive arm reciprocal in said housing and having a drive slot therein and a drive head attached thereto, said peg received in said slot, a second gear mounted in said housing orthogonally with respect to said first gear and being engaged therewith, said second gear having an end with a recess therein, said first gear having a recess in a center portion thereof, each of said recesses adapted to receive a removable drive pin extending from a rotary power tool whereby rotation of the drive pin received in either of said recesses causes reciprocation of said drive head along an axis perpendicular to the rotational axis of said first gear.

2. The apparatus as recited in claim 1, wherein said drive pin is hexagonal and said recesses in said first and second gears are hexagonal recesses.

3. The apparatus as recited in claim 1, wherein the recesses of said first and second gears are adapted to receive a drive pin having spring-loaded locking means for temporarily providing a friction attachment between said recess and said drive pin.

4. The apparatus as recited in claim 1 further comprising a removable handle removably attached to said housing.

5. The apparatus as recited in claim 4, wherein said housing includes a plurality of threaded openings for receiving a threaded portion of said removable handle.

6. The apparatus as recited in claim 1, wherein said blade drive head has a plurality of blade mounting recesses providing for a plurality of different orientations of a blade extending from the front of the blade head.

7. The apparatus as recited in claim 6, wherein said blade drive head is a yoke suspended from said housing.

8. The apparatus as recited in claim 6, wherein at least one of said blade mounting recesses is located to provide for a blade flush cut.

9. The apparatus as recited in claim 6, wherein each of said blade mounting recesses is adapted to receive a conventional saw blade.

10. The apparatus as recited in claim 6, further comprising a quick release assembly for releasably locking a saw blade in any one of said blade mounting recesses.

11. The apparatus as recited in claim 1, wherein said first gear is mounted for rotation about a fixed axis in said housing and said second gear is mounted for rotation about a movable axis perpendicular and radial to the rotation axis of said first gear.

12. The apparatus as recited in claim 11, wherein said second gear is mounted in said housing in a manner providing for translation of said second gear through an arc of at least 90 degrees about the axis of rotation of said first gear.

13. The apparatus as recited in claim 12, wherein said second gear can translate through an arc greater than 180 degrees.

14. The apparatus as recited in claim 12 further comprising a plurality of pairs of cross-members within said housing for defining a plurality of drive positions for said second gear.

15. The apparatus as recited in claim 1, wherein said first gear is counterweighted opposite said peg to reduce vibration during reciprocation of the blade head.

16. The apparatus as recited in claim 1 further comprising a pivotally-mounted fence attached to the forward edge of said housing and having a first position adjacent the top surface of said housing and a second position adjacent the front surface of said blade head.

17. The apparatus as recited in claim 1, wherein the axis of rotation of each of said first and second gears intersect.

18. The apparatus as recited in claim 1, wherein the axis of rotation of said first and second gears are transverse.

19. The apparatus as recited in claim 1, wherein said first and second gears are bevel gears.

20. The apparatus as recited in claim 1, wherein said first gear is a helical gear and said second gear is a worm gear.

21. The apparatus as recited in claim 1 further comprising a third gear mounted in said housing orthogonally with respect to said first gear and being engaged therewith.

22. The apparatus as recited in claim 21, wherein the axis of rotation of said first, second and third gears intersect.

23. The apparatus as recited in claim 21, wherein the axis of rotation of each of said second and third gears is transverse to the axis of rotation of said first gear.

24. The apparatus as recited in claim 21, wherein each of said gears is a bevel gear.

25. The apparatus as recited in claim 21, wherein each of said second and third gears is a worm gear and said first gear is a helical gear.

26. A power tool comprising the apparatus as recited in claim 1 in combination with the removable drive pin and the rotary power tool.

27. The power tool as recited in claim 26, wherein said rotary power tool is a cordless drill.

28. A power tool adapter kit for converting a rotary power tool into a reciprocating saw device comprising the apparatus as recited in claim 1, a removable drive pin and a removable handle.

29. The kit as recited in claim 28 further comprising a plurality of saw blades.

30. The kit as recited in claim 28 wherein said removable handle has a swivel.

31. A power tool attachment for converting rotary motion from a power tool into reciprocating motion of a saw comprising: a housing, a helical gear mounted in said housing and having a peg mounted eccentrically thereon, a blade connected to a blade drive arm, said blade drive arm reciprocable in said housing and having a slot therein, said peg received in said slot, a first worm gear mounted in said housing orthogonally with respect to and being engaged with said helical gear, said first worm gear having an end with a recess therein, said helical gear having a recess in a center portion thereof, and a removable drive pin receivable in any one of said recesses and a rotatable power tool chuck at opposite ends thereof, whereby rotation of said power tool chuck enables the reciprocation of said blade along an axis orthogonal to a rotation axis of said helical gear.

32. The power tool attachment of claim 31, wherein said recesses in said first worm gear and said helical gear are hexagonal recesses.

33. A power tool attachment for converting rotary motion from a power tool into reciprocating motion of a saw comprising: a housing, a first bevel gear mounted in said housing and having a peg mounted eccentrically thereon, a blade removably attached to a slider connected to a blade drive arm, said blade drive arm reciprocable in said housing and having a slot therein, said peg received in said slot, a second bevel gear mounted in said housing orthogonally with respect to and being engaged with said first bevel gear, said second bevel gear having a recess therein, said first bevel gear having a recess in a center portion thereof, and a removable drive pin receivable in any one of said recesses and a rotatable power tool chuck at opposite ends thereof, whereby rotation of said power tool chuck enables the reciprocation of said blade along an axis parallel to a rotation axis of said power tool chuck or along an axis orthogonal to said axis of said power tool chuck depending upon which recess the drive pin is received.

34. The power tool attachment of claim 33, wherein said recesses in said first and second bevel gears are hexagonal recesses.

35. The power tool attachment of claim 33, wherein said second bevel gear is smaller in diameter than said first bevel gear, such that said saw blade reciprocates at a greater frequency when said drive pin is engaged with the recess of said first bevel gear, than when said drive pin is engaged with the recess of said second bevel gear.

36. The power tool attachment of claim 33, further comprising a saw fence pivotally mounted to said housing between a position adjacent said saw blade and a position spaced from said saw blade.

37. The power tool attachment of claim 33, wherein said slot in said blade drive arm is slanted to provide a faster cutting stroke than cleaning stroke.

38. The power tool attachment of claim 33, further comprising a third bevel gear mounted in said housing orthogonally with respect to and being engaged with said first bevel gear.

39. The power tool attachment of claim 38, wherein said third bevel gear has a recess therein adapted to receive a removable drive pin.

* * * * *